US012137508B1

(12) United States Patent
Armstrong

(10) Patent No.: US 12,137,508 B1
(45) Date of Patent: Nov. 5, 2024

(54) INDUCTION FURNACE WITH ELECTRICALLY SEPARABLE COIL SYSTEM

(71) Applicant: Inductotherm Corp., Rancocas, NJ (US)

(72) Inventor: Herbert T. Armstrong, Southampton, NJ (US)

(73) Assignee: INDUCTOTHERM, CORP., Rancocas, NJ (US)

( * ) Notice: Subject to any disclaimer, the term of this patent is extended or adjusted under 35 U.S.C. 154(b) by 0 days.

(21) Appl. No.: 18/605,967

(22) Filed: Mar. 15, 2024

Related U.S. Application Data

(60) Provisional application No. 63/529,782, filed on Jul. 31, 2023.

(51) Int. Cl.

| | |
|---|---|
| ***H05B 6/06*** | (2006.01) |
| ***F27D 11/06*** | (2006.01) |
| ***H05B 6/10*** | (2006.01) |
| ***H05B 6/16*** | (2006.01) |
| ***H05B 6/42*** | (2006.01) |

(52) U.S. Cl.
CPC ............... *H05B 6/06* (2013.01); *F27D 11/06* (2013.01); *H05B 6/42* (2013.01)

(58) Field of Classification Search
CPC .............. H05B 6/06; H05B 6/42; F27D 11/06
USPC ....... 219/662, 620, 625, 626, 627, 634, 635, 219/638, 650, 656, 647, 648, 649; 373/144, 150, 151, 138, 139, 145, 146, 373/147, 148, 149, 152, 154, 153, 155, 373/156
See application file for complete search history.

(56) References Cited

U.S. PATENT DOCUMENTS

| | | | | |
|---|---|---|---|---|
| 6,542,535 | B2 | 4/2003 | Fishman et al. | |
| 7,457,344 | B2 | 11/2008 | Fishman et al. | |
| 9,370,049 | B2 | 6/2016 | Fishman et al. | |
| 2006/0118549 | A1* | 6/2006 | Fishman ................ | H05B 6/067 219/662 |
| 2007/0081572 | A1 | 4/2007 | Fishman et al. | |
| 2014/0332176 | A1 | 11/2014 | Waniuk et al. | |
| 2016/0216180 | A1 | 7/2016 | LeMay et al. | |

FOREIGN PATENT DOCUMENTS

| | | | |
|---|---|---|---|
| JP | 0246660 A2 * | 5/1987 | |
| JP | H07111187 A * | 4/1995 | |

* cited by examiner

*Primary Examiner* — Quang T Van
(74) *Attorney, Agent, or Firm* — Robert J. Everling

(57) ABSTRACT

An induction coil furnace system includes at least an active induction coil and a passive induction coil surrounding a furnace volume. The active induction coil is connected to an AC power supply, while the passive induction coil is connected in parallel with one or more capacitors forming an L-C tank circuit. The connections to the AC power supply and the one or more capacitors are optionally an interchangeable connection, such that the active coil can become the passive coil upon disconnection of the AC power supply and connection of the one or more capacitors. Likewise, the passive coil can become the active coil upon disconnection of the one or more capacitors and connection of the AC power supply. The active coil is selectively electrically connected to the passive coil via a separable electrical connection, whereupon separation, the active coil and the passive coil are electrically isolated.

20 Claims, 17 Drawing Sheets

INDUCTION FURNACE WITH ELECTRICALLY SEPARABLE COIL SYSTEM

CROSS REFERENCE TO RELATED APPLICATIONS

This application claims the benefit of U.S. Provisional Application No. 63/529,782, filed Jul. 31, 2023, hereby incorporated by reference in its entirety.

FIELD OF THE INVENTION

The present invention relates generally to electric induction furnaces and more particularly to induction furnaces having active and passive coils selectively electrically connected, such as by a removable external jumper cable or a selector switch, such that the active and passive coils are readily interchangeable and capable of electrical isolation for independent operation.

BACKGROUND OF THE INVENTION

Electric induction furnaces are used to heat and melt metals and other electrically conductive materials. As shown in FIGS. 1(*a*) and 1(*b*), an induction furnace 10 utilizes an induction coil L1 that is powered from an AC power source 14 having an AC-DC rectifier section 14*a*, a DC-AC inverter section 14*b*, and a tuning capacitor section 14*c*. Alternating current flowing through the induction coil L1 creates a magnetic field that is applied to the electrically conductive charge placed inside of the furnace's coil. Eddy currents induced by the field in the charge can be used to heat, melt, and superheat the charge. The magnetic coupling between the induction coil L1 and the charge is analogous to a magnetic transformer coupling wherein the induction coil L1 represents the primary winding, and the electrically conductive charge represents a shorted secondary winding.

Induction furnace systems have been disclosed in the prior art to increase efficiency of the induction coil by utilizing a combination of an active induction coil connected to the AC power source 14, and a passive induction coil connected to an L-C tank circuit 16 and magnetically coupled to the active induction coil. As illustrated in FIGS. 1(*c*) and 1(*e*), either the top coil L1 or the bottom coil L2 may be electrically connected to the AC power source 14 or the L-C tank circuit 16 to form the active induction coil and the passive induction coil, respectively. U.S. Pat. No. 6,542,535 (the '535 patent), herein incorporated by reference in its entirety, particularly discloses an active/passive coil system utilizing the passive coil to reflect the resistance of the L-C tank circuit 16 into the active induction coil to improve the efficiency of the induction furnace system. The '535 patent further discloses a pair of distinct coils or a singular coil having active and passive sections.

Typically, as illustrated in FIGS. 1(*c*) through 1(*f*), the active and passive coils of such induction furnace systems are electrically connected via internal and permanent copper brazing 18 between the adjacent turns of the active and passive coils. For example, when the top coil L1 represents an active coil and the bottom coil L2 represents the passive coil, the bottom turn of the top coil L1 is brazed to the top turn of the bottom coil L2. This electrical connection eliminates voltage differentials between the two coils which could otherwise degrade the insulation, reducing the effective operation and life cycle of the induction coil system. Furthermore, in active/passive coil systems, the electrical connection between the two coils operably connects the passive coil to any ground leakage detection (GLD) systems incorporated into the active coil via the AC power source. GLD systems provide fault monitoring, informing the operator of refractory lining wear or metal infiltrates that cause a short from the load to one of the coils. As such, any shorts developed in the passive coil or passive coil section are detected by the GLD system and appropriate shutdown and maintenance operations can proceed.

As a result of the permanent electrical connection between the active and passive coils, operational difficulties can arise where shorts only affecting a single coil halt operation of the induction furnace until the short is addressed, reducing overall throughput of the furnace. Typically, when a fault is detected, diagnostics must be performed to troubleshoot and locate the cause of the fault, during which time furnace operations must be halted. Once the source of the fault is found, repairs must be made, such as relining the furnace, which also includes delays due to maintenance crew availability. Until the source of the fault is found and repaired, the furnace remains inoperable in any capacity. Additionally, the life cycle of a furnace may result in further operating difficulties due to fault monitoring and permanent electrical connection between the active and passive coils. For example, when a new refractory lining is installed, excess moisture within the lining may result in high GLD readings during the initial weeks after installation, which may delay or prevent operation of the furnace until the lining fully dries.

Furthermore, typical active and passive induction coil systems have limited flexibility as the two coils are incapable of being interchanged between the active and passive states while the associated furnace is full of molten metal. For example, the top coil L1 remains the active coil through operation of the coil system, while the bottom coil L2 remains the passive coil or vice versa. Which coil preferably serves as the active coil or the passive coil may change through the course of operation of the furnace due to desired stirring or heating properties at various points of operation. For example, the bottom coil L2 being connected to the AC power source 14 and therefore becoming the active coil provides an advantage when initially filling the furnace as the bottom coil L2 can be operated earlier with minimal material charged into the furnace without risking damage to upper furnace parts. When the top coil L1 is the active coil, power cannot be supplied until the level of the furnace reaches the top coil, and only then at a limited power level until the top coil is completely full, otherwise the shunts may overheat causing damage to the other furnace parts. However, as the electrical connections to the coil and the capacitor bank also carry cooling water to the coil, attempting to exchange the power source and the capacitor bank between coils or coil sections while the furnace contains molten metal will overheat and damage the coil and surrounding structures.

Additionally, when dealing with molten metal, the accumulation of impurities or dross can produce significant interference with operation of the associated induction heating application, such as a coating pot. During operation, impurities accumulate and typically collect and adhere along the bottom or sides of the pot which can then impinge on the rollers of the feed material or other submerged equipment within the molten metal, causing defects on the feed material, the coating being applied to the feed material, or both. Removal of the dross at this point requires significant effort and can take the coating pot offline for an extended length of time. Typically, stirring the molten metal can reduce the rate of dross accumulation, as higher intensity stirring can prevent the dross from settling, however stirring patterns cannot be readily optimized by solely adjusting the input power and frequency of a single portion of a split-coil construction, such as the active portion of the active/passive coil systems of the prior art. Particularly, when the active portion of the induction coil system is disposed along an upper coil, stirring intensity is localized towards the upper portion of the furnace volume, while comparatively lower intensity stirring is localized to the lower portion. Throughout the course of operation, adjusting the stirring intensity between both the upper portion and the lower portion of the furnace volume can reduce dross accumulation.

Therefore, there is a need for an electric induction furnace having an active coil and a passive coil capable of electrical isolation for independent operation, and furthermore, for an electric induction furnace having an active coil and a passive coil selectively interchangeable between the active and passive states.

BRIEF SUMMARY OF THE INVENTION

In one aspect, the present invention is an apparatus for heating and melting electrically conductive material in an induction furnace system having an induction coil assembly defining an active coil or active coil section connected to a suitable alternating current (AC) power source and a passive coil or passive coil section connected to one or more capacitors forming an L-C tank circuit, wherein the active coil or active coil section and the passive coil or passive coil section are electrically connected via a removable jumper cable disposed exterior to the induction coil, such that the active coil or active coil section and the passive coil or passive coil section are capable of electrical isolation upon removal of the removable jumper cable.

In another aspect, the present invention is a method of electrically isolating a top coil or top coil section from a bottom coil or bottom coil section of an induction coil assembly by removing an external jumper cable electrically connecting the top coil or top coil section to the bottom coil or bottom coil section and connecting a suitable AC power source to one of the top coil or top coil section or the bottom coil or bottom coil section to independently operate the associated coil or coil section.

In another aspect, the present invention is a method for reconfiguring connections to one of a suitable power supply and a capacitor bank from a top coil or top coil section to a bottom coil or bottom coil section, such that the top coil or top coil section and the bottom coil or the bottom coil section are selectively interchangeable between an active state and a passive state during the course of operation of the induction furnace.

The above and other aspects of the present invention are set forth in this specification and the appended claims.

BRIEF DESCRIPTION OF THE DRAWINGS

The drawings, as briefly summarized below, are provided for exemplary understanding of the invention, and do not limit the invention as further set forth in this specification.

FIG. 1(*b*) illustrates a simplified circuit diagram of the induction furnace system of FIG. 1(*a*).

FIG. 1(*c*) illustrates a diagrammatic plan view of an induction furnace system with an improved efficiency coil system of the prior art where the top coil is connected to an AC power source.

FIG. 1(*d*) illustrates a simplified circuit diagram of the induction furnace system of FIG. 1(*c*).

FIG. 1(*e*) illustrates a diagrammatic plan view of an induction furnace system with an improved efficiency coil system of the prior art, where the bottom coil is connected to an AC power source.

FIG. 1(*f*) illustrates a simplified circuit diagram of the induction furnace system of FIG. 1(*e*).

FIG. 2(*b*) illustrates a simplified circuit diagram of the induction furnace with electrically separable coil system of FIG. 2(*a*).

FIG. 2(*c*) illustrates a diagrammatic plan view of an alternate example of the induction furnace with electrically separable coil system of FIG. 2(*a*) utilizing a variable frequency resonant power supply and an adjustable capacitor bank.

FIG. 2(*d*) illustrates a simplified circuit diagram of the induction furnace with electrically separable coil system of FIG. 2(*c*).

FIG. 2(*e*) illustrates a diagrammatic plan view of an alternate example of the induction furnace with electrically separable coil system of FIG. 2(*a*) utilizing a pulse width modulation power supply and a software control system.

FIG. 2(*f*) illustrates a simplified circuit diagram of the induction furnace with electrically separable coil system of FIG. 2(*e*).

FIG. 3(*b*) illustrates a simplified circuit diagram of the induction furnace with electrically separable coil system of FIG. 3(*a*).

FIG. 3(*c*) illustrates a diagrammatic plan view of an alternate example of the induction furnace with electrically separable coil system of FIG. 3(*a*) utilizing a variable frequency resonant power supply and an adjustable capacitor bank.

FIG. 3(*d*) illustrates a simplified circuit diagram of the induction furnace with electrically separable coil system of FIG. 3(*c*).

FIG. 3(*e*) illustrates a diagrammatic plan view of an alternate example of the induction furnace with electrically separable coil system of FIG. 3(*a*) utilizing a pulse width modulation power supply and a software control system.

FIG. 3(*f*) illustrates a simplified circuit diagram of the induction furnace with electrically separable coil system of FIG. 3(*e*).

FIG. 4(*b*) illustrates the induction furnace with electrically separable coil system of FIG. 4(*a*) with the selector switches connecting the top coil to the active circuit and the bottom coil to the passive circuit.

FIG. 4(*c*) illustrates the induction furnace with electrically separable coil system of FIG. 4(*a*) with the selector switches connecting the bottom coil to the active circuit and the top coil to the passive circuit.

FIG. 5(*b*) illustrates a cross-sectional view of an example of the induction furnace with electrically separable coil system of FIG. 4(*a*) with the selector switches connecting the top coil to the active circuit and the top and bottom coils electrically separated for operation with the top coil only.

FIG. 6(*b*) illustrates a diagrammatic plan view of the independent water-cooling system having independent water sources of an example of the induction furnace with electrically separable coil system.

FIG. 6(*c*) illustrates a diagrammatic plan view of the independent water-cooling system having a shared water source and utilizing multiport valves of an example of the induction furnace with electrically separable coil system.

FIG. 7(*b*) illustrates a cross-sectional view of an improved stirring pattern facilitated by the electrically separable coil system of the present invention showing reduced dross accumulation.

FIG. 7(*c*) illustrates a cross-sectional view of an alternative improved stirring pattern facilitated by the electrically separable coil system of the present invention showing reduced dross accumulation.

FIG. 8(*b*) illustrates a cross-sectional view of the induction furnace system of FIG. 8(*a*) in a partially filled state with the top coil coupled to the bottom coil causing some components of the furnace system to overheat.

FIG. 8(*c*) illustrates a cross-sectional view of the induction furnace system of FIG. 8(*a*) in a partially filled state with the top coil disconnected and electrically separated from the bottom coil.

FIG. 8(*d*) illustrates a cross-sectional view of the induction furnace system of FIG. 8(*a*) in a filled state with the top coil connected to the active circuit and the bottom coil connected to the passive circuit.

FIG. 8(*e*) illustrates a cross-sectional view of the induction furnace system of FIG. 8(*a*) in a filled state with the bottom coil disconnected and electrically separated from the top coil.

DETAILED DESCRIPTION OF THE INVENTION

Figure 1A:
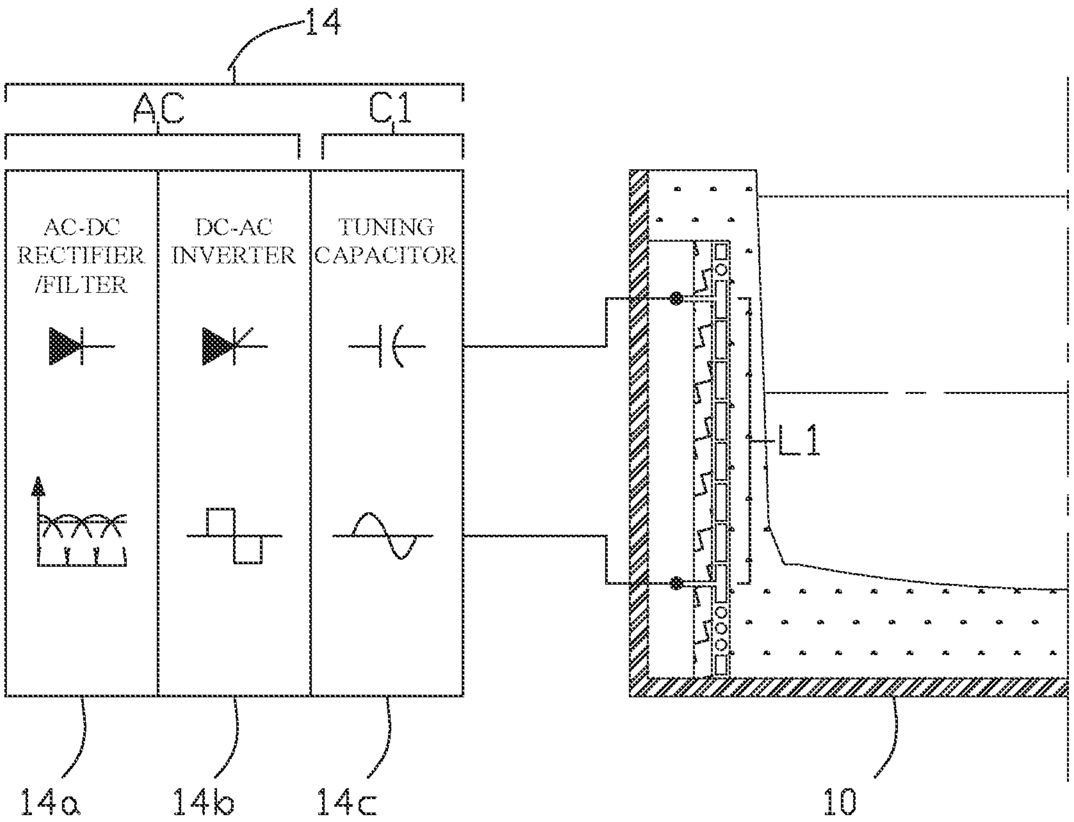
FIG. 1(a) PRIOR ART
FIG. 1(*a*) illustrates a diagrammatic plan view of a conventional induction furnace system.
Figure 1B:
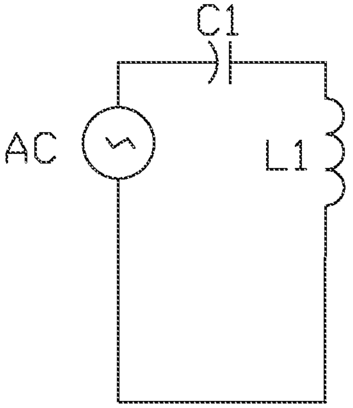
FIG. 1(b) PRIOR ART
Figure 1C:
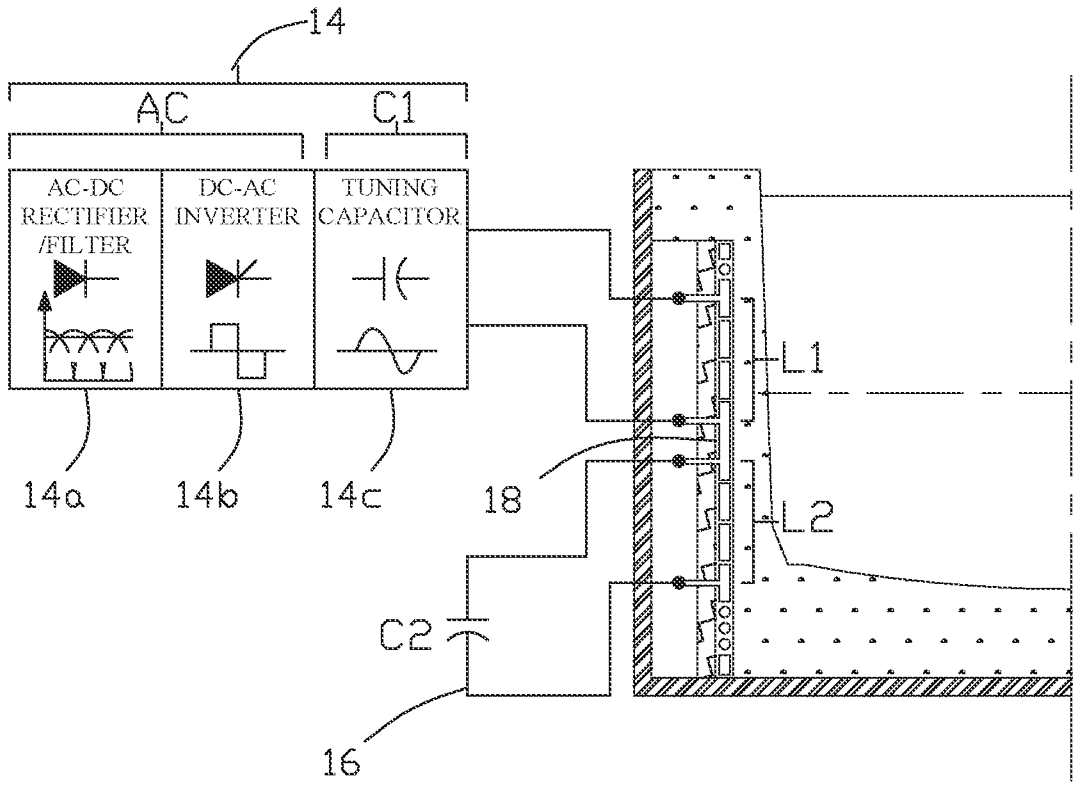
FIG. 1(c) PRIOR ART
Figure 1D:
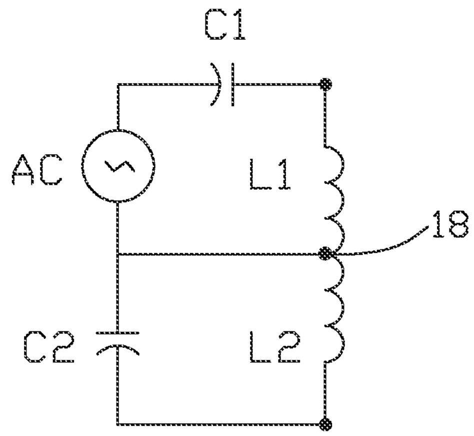
FIG. 1(d) PRIOR ART
Figure 1E:
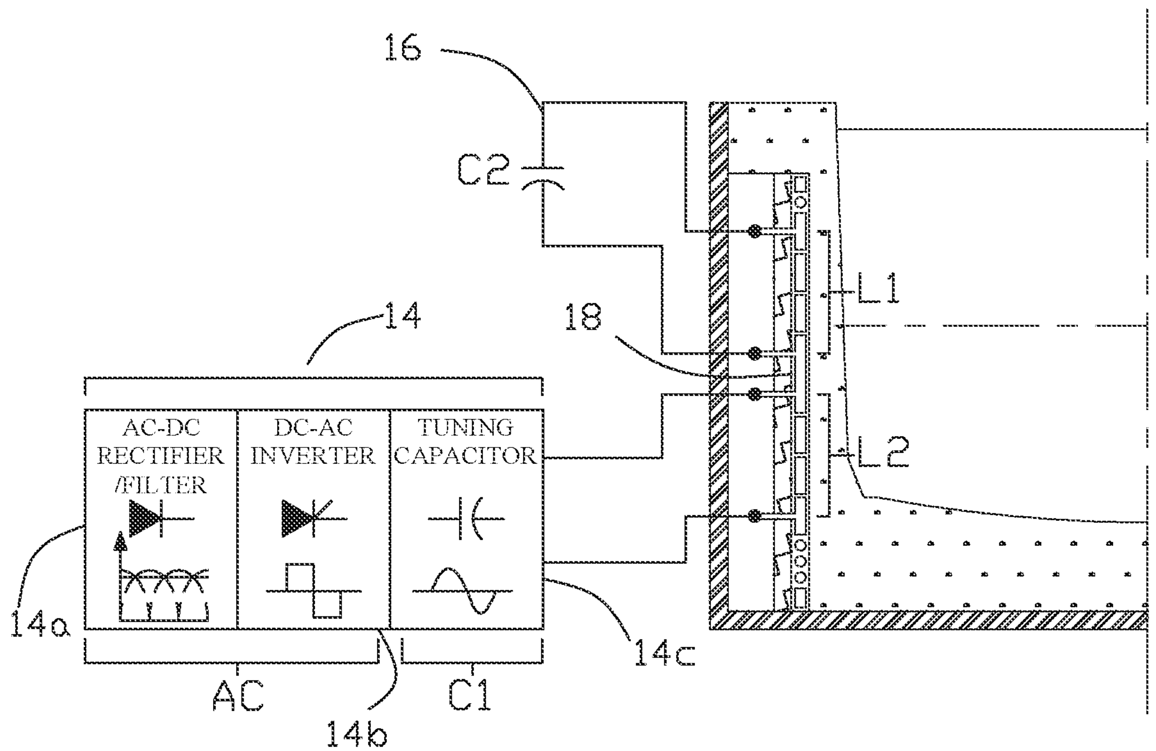
FIG. 1(e) PRIOR ART
Figure 1F:
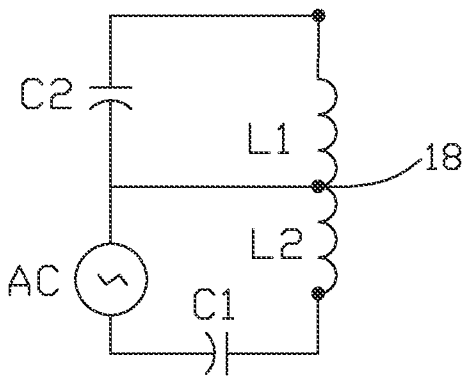
FIG. 1(f) PRIOR ART
Figure 2A:
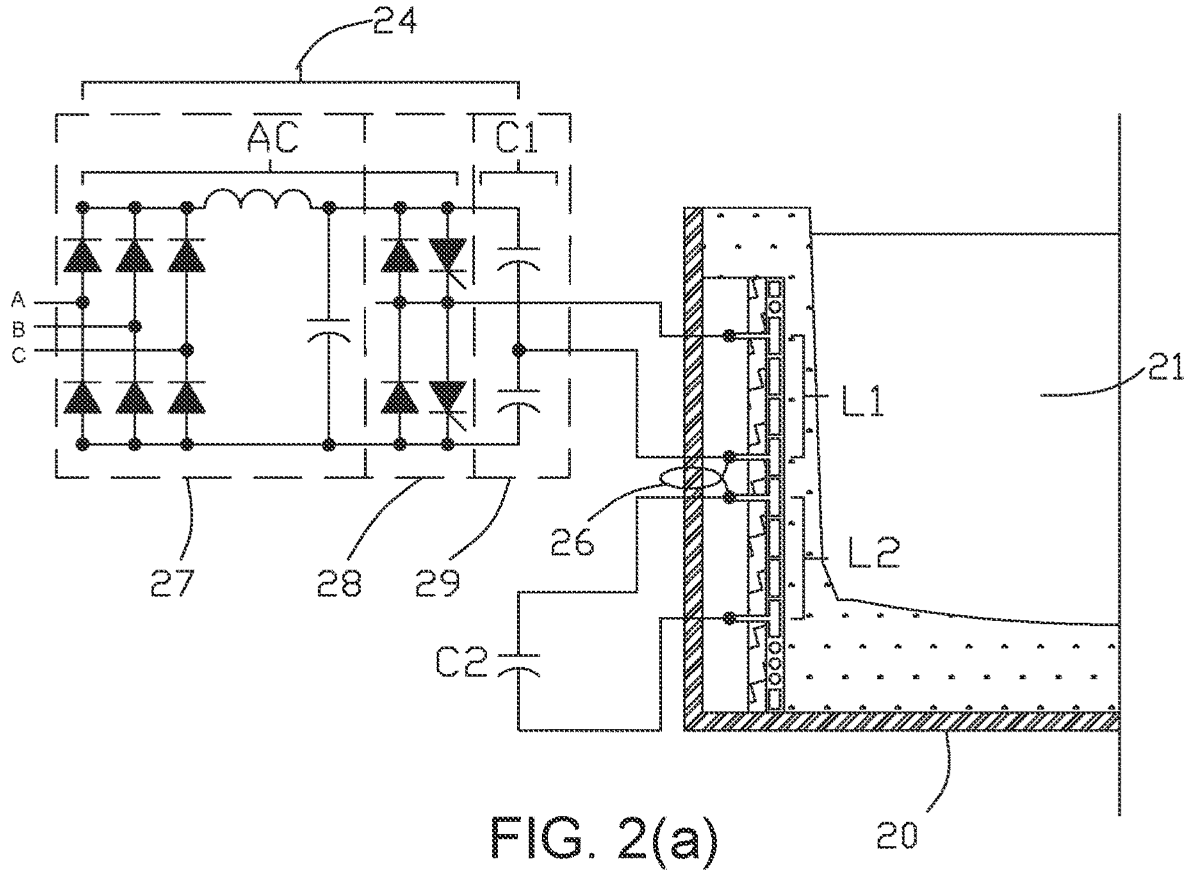
FIG. 2(*a*) illustrates a diagrammatic plan view of one example of an induction furnace with electrically separable coil system of the present invention where the top coil is connected to the active circuit.
Figure 2B:
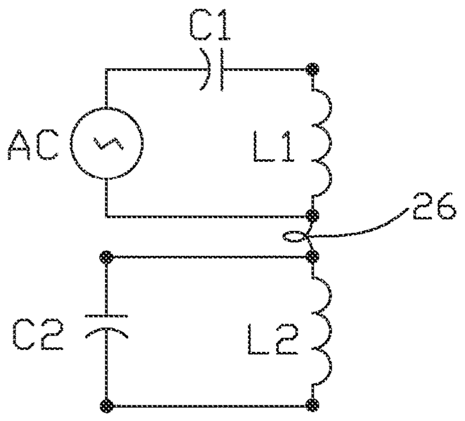
Figure 2C:
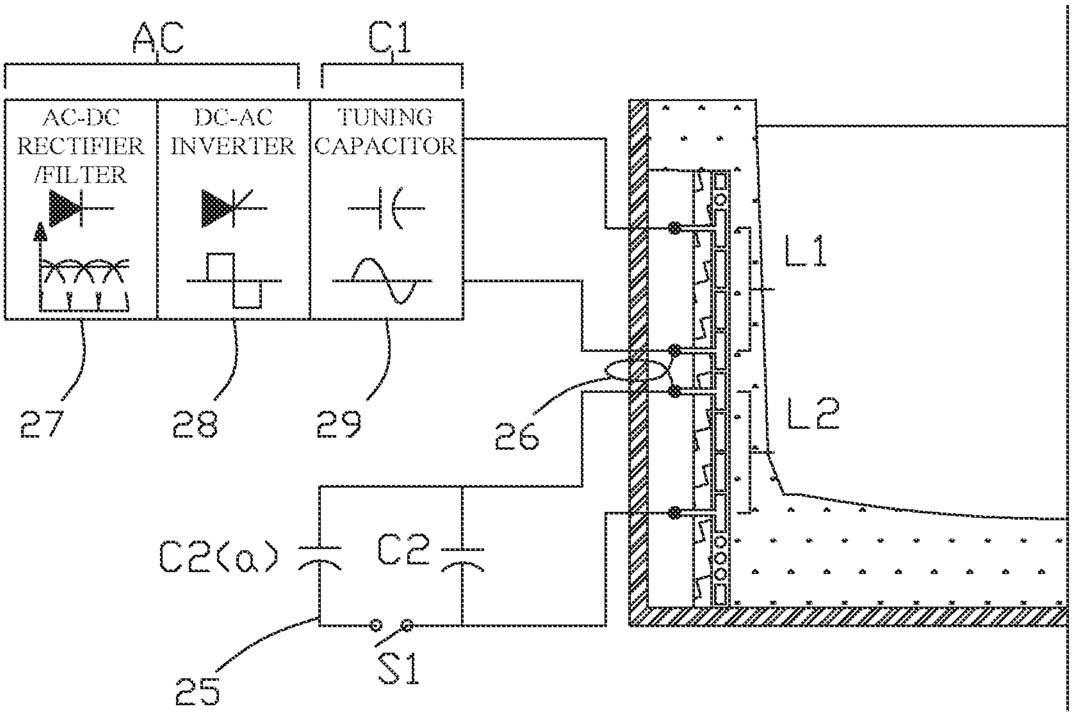
Figure 2D:
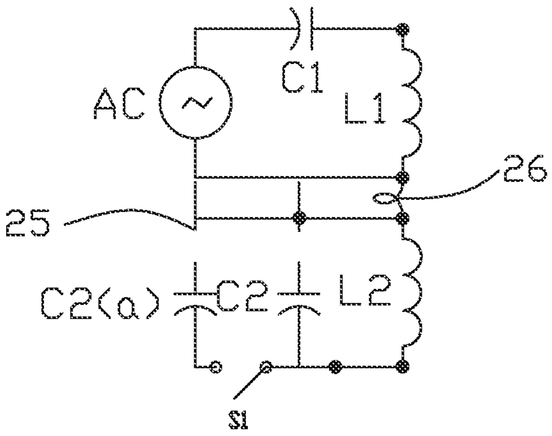
Figure 2E:
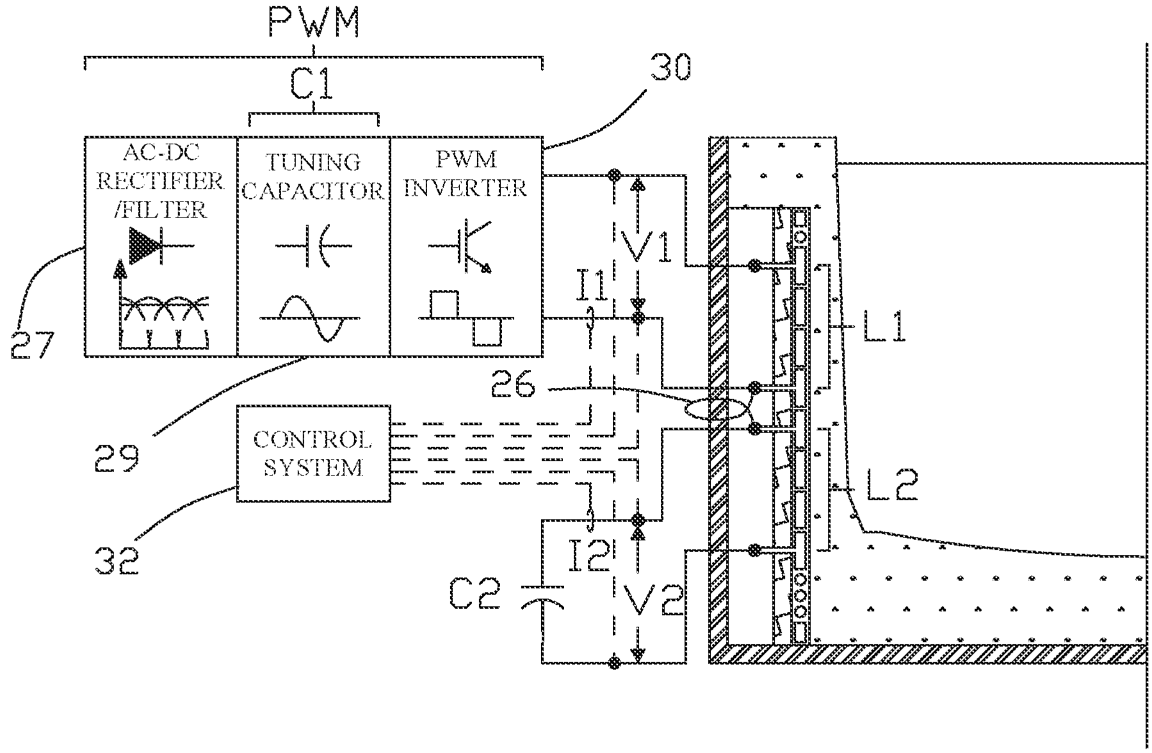
Figure 2F:
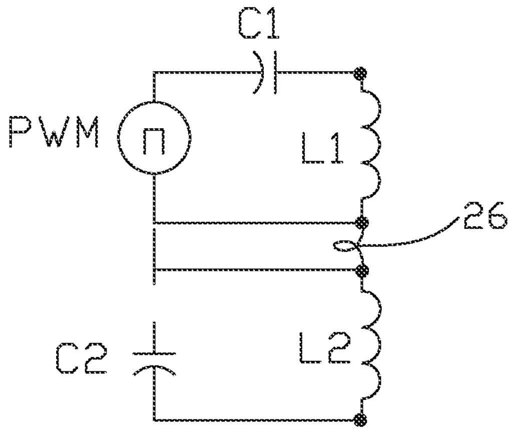
Figure 3A:
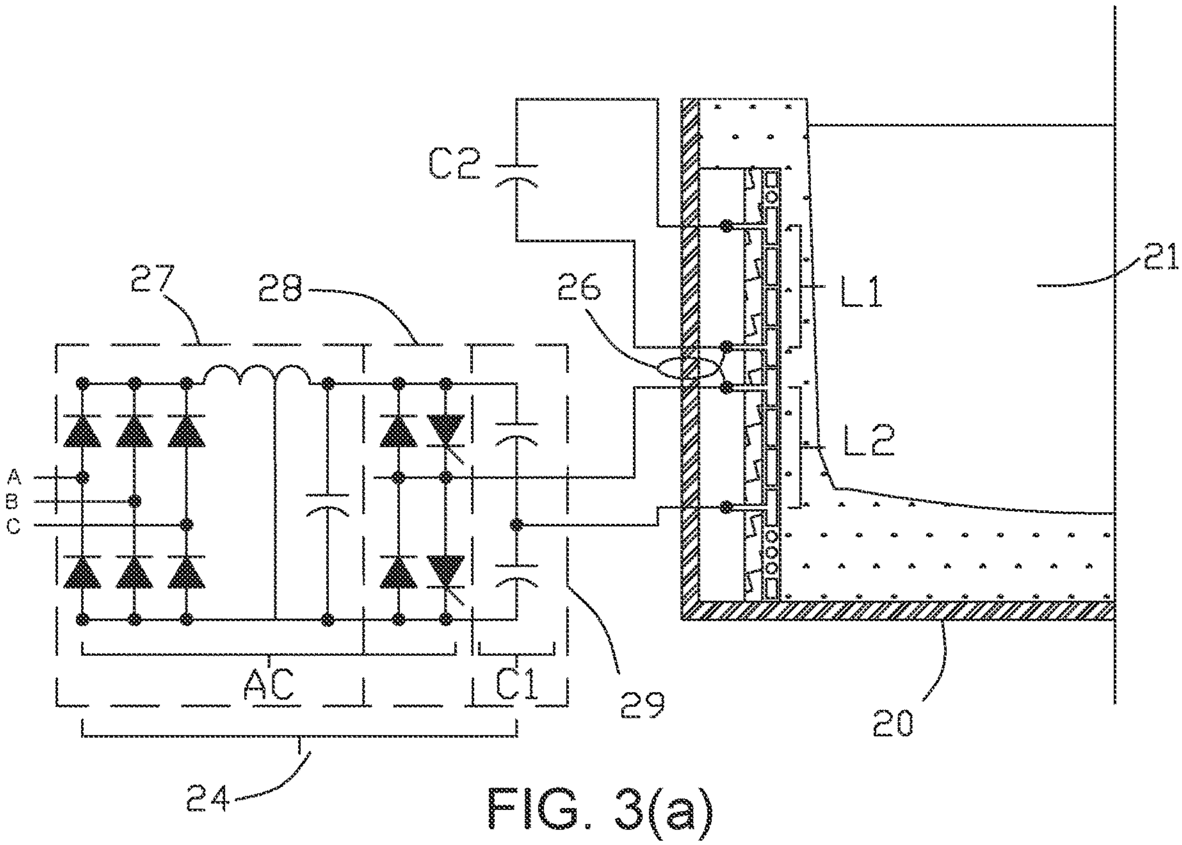
FIG. 3(*a*) illustrates a diagrammatic plan view of one example of an induction furnace with electrically separable coil system of the present invention where the bottom coil is connected to the active circuit.
Figure 3B:
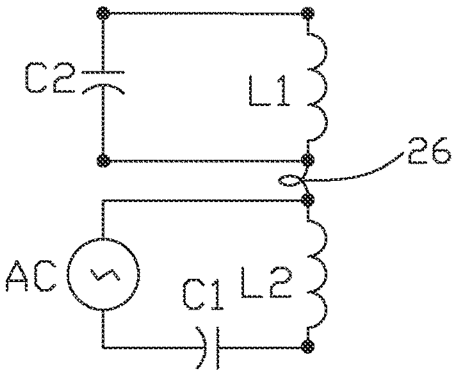
Figure 3C:
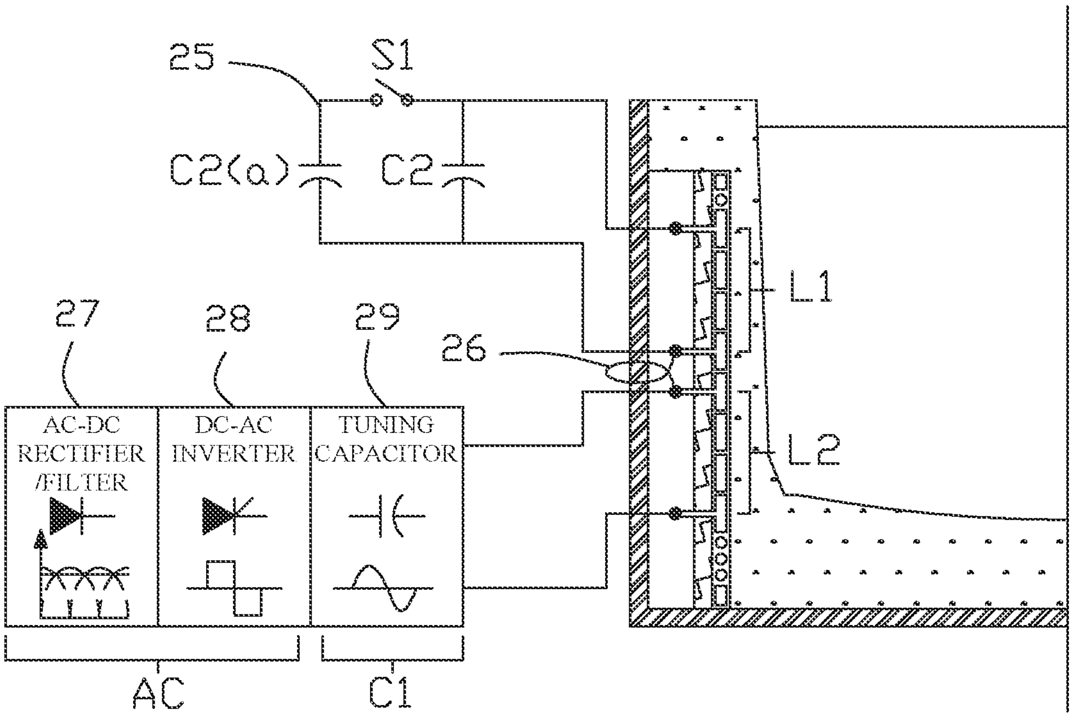
Figure 3D:
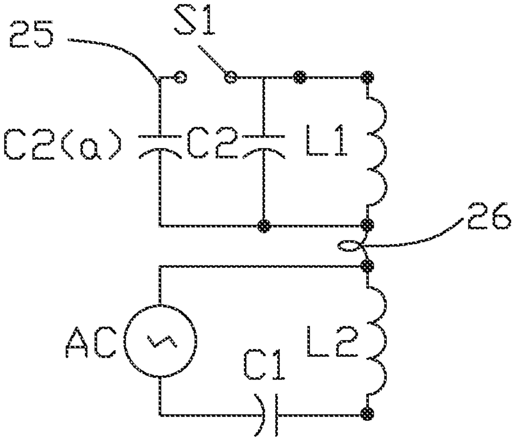
Figure 3E:
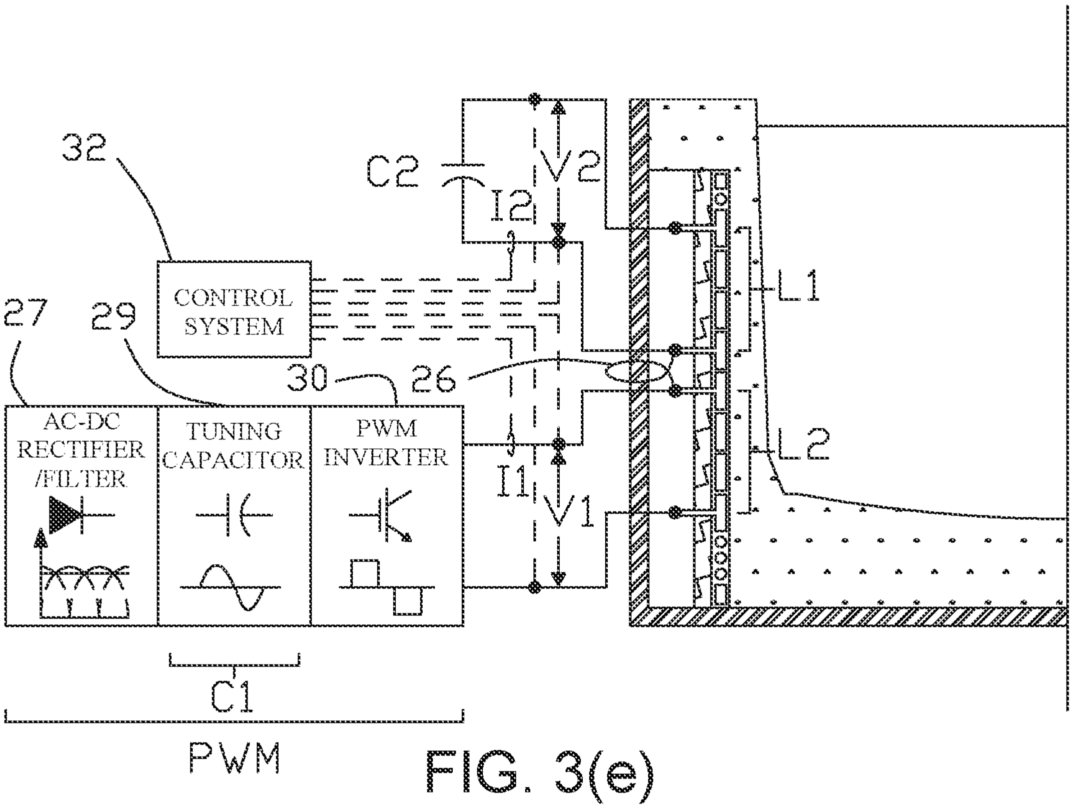
Figure 3F:
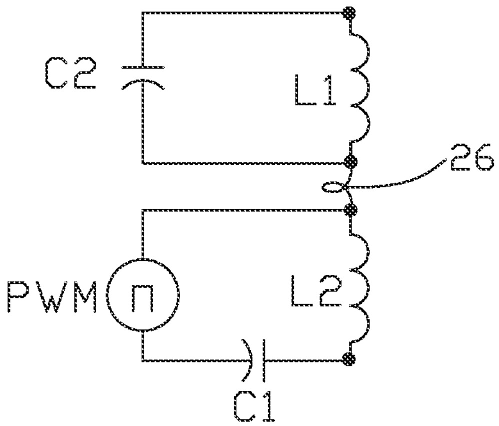

Referring now to the drawings, wherein like numerals indicate like elements, there is shown in FIGS. 2(*a*) through 2(*f*), in accordance with the present invention, examples of an induction furnace system utilizing an electrically separable coil system.

For the purposes of illustration, the following disclosure discusses the present invention in relation to induction heating of a coating pot system, however, it should be understood by one of skill in the art that the present invention is not necessarily limited to induction coating pot systems and other induction furnace heating applications are within the scope of the disclosure.

Induction furnace system 20 includes a furnace volume 21 into which an electrically conductive material (charge or load) is placed, whereupon the electrically conductive material is inductively heated, melted, and superheated via an induction coil disposed around the furnace volume. In an exemplary embodiment, the induction furnace system 20 comprises a coating pot having a feed mechanism for immersing a feed material within the molten charge to be coated. The coating pot further comprises one or more rollers immersed in the molten charge about which the feed material is guided.

In the illustrated embodiments, the induction coil comprises a split-coil configuration defining either a distinct top coil L1 and bottom coil L2 sharing a common load, or a single coil defining a top coil section and a bottom coil section. In alternate embodiments, induction coil configurations including more than two induction coils or coil sections are contemplated. As illustrated in FIGS. 2(*a*), 2(*c*), and 2(*c*), the top coil L1 or top coil section is connected at its end terminals to a suitable AC power source 24 defining an active coil, while the bottom coil L2 or bottom coil section is connected to one or more parallel capacitors C2 to define a parallel L-C tank circuit defining a passive coil. In the illustrated embodiments of 2(*a*) and 2(*c*), the AC power source 24 comprises an AC/DC rectifier or filter section 27, a DC/AC inverter section 28, and a tuning capacitor section 29. The magnetic field created by the flow of current in the top coil L1 creates a flux field that is magnetically coupled to the bottom coil L2, which induces current in the bottom coil L2. The one or more parallel capacitors C2 can further comprise an adjustable capacitor bank 25, as shown in FIG. 2(*c*), comprising one or more supplemental capacitors C2(*a*) in parallel selectively connected via one or more intermediate switches S1, removable bus links, cables, or the like. In this manner, the capacitance of the L-C tank circuit can be readily adjusted to control resonance within the L-C tank circuit. In the illustrated embodiment of FIG. 2(*c*), one supplemental parallel capacitor C2(*a*) is shown, however, it should be noted that capacitor banks 25 having any number of capacitors each selectively separable from the L-C tank circuit by one or more intermediate switches S1 is within the scope of the present disclosure.

Inversely, as shown in FIGS. 3(*a*) through 3(*f*), the bottom coil L2 or bottom coil section is connected at its end terminals to a suitable AC power source 24 defining an active coil, while the top coil L1 or top coil section is connected to one or more capacitors C2 to define a parallel L-C tank circuit defining a passive coil. Similarly, the magnetic field created by the flow of current in the bottom coil L2 creates a flux field that is magnetically coupled to the top coil L1, which induces current in the top coil L1. The terminal connections between each coil and each of the AC power source 24 and the one or more capacitors C2 are identical and interchangeable, such that the terminal connections can readily be exchanged between the top coil L1 and the bottom coil L2, as necessary. In this manner, the top coil L1 and the bottom coil L2 can each alternately serve as the passive coil and the active coil throughout operation of the induction furnace system 20 to maximize efficiency of operation throughout the heating process as further described elsewhere herein.

In the shown embodiments, an external and removable jumper cable 26 electrically connects the top coil L1 to the bottom coil L2, such that voltage differentials between the top coil L1 and bottom coil L2 are prevented, thereby extending life and operation of the coil. The jumper cable 26 or other appropriate means of separable connection between the top coil L1 and the bottom coil L2 can further include one or more passive filters, such as a choke. In the shown embodiment, the jumper cable 26 is operably connected to a bottom turn of the top coil L1 and a top turn of the bottom coil L2. The jumper cable 26 may be removable from each coil at both ends, such that the jumper cable 26 is completely removed from the induction furnace system, or alternatively removable only at one end of the jumper cable 26, such that the electrical discontinuity is defined at one of the bottom turn of the top coil L1 or the top turn of the bottom coil L2. In induction coil system embodiments having more than two induction coils, a jumper cable 26 is removably affixed between each adjacent coil. Furthermore, the jumper cable 26 operably connects the passive coil to the GLD system present within the AC power source 24 connected to the active coil. In this manner, the ground faults in the passive coil are detected via the electrical connection between the active coil and the passive coil. Alternatively, in some embodiments, a separate GLD system is associated with each of the top coil L1 and the bottom coil L2 to identify more readily in which of the top coil L1 and the bottom coil L2 a fault has occurred. In such embodiments, a capacitor is electrically connected between the top coil L1 and the bottom coil L2 to block DC current from one coil's GLD system from detecting a fault on the other coil. As the jumper cable 26 is external, the jumper cable 26 is readily accessible to allow electrical isolation of the top coil L1 from the bottom coil L2 should a fault be detected. Once removed, the top coil L1 and the bottom coil L2 are separated by an air gap and are capable of independent operation while the adjacent coil is offline. For example, when a ground fault is detected in the active coil section, the jumper cable 26 can be removed, electrically isolating the active coil from the passive coil, such that the AC power source 24 can be disconnected from the active coil section and reconnected to the former passive coil section to continue operation while maintenance procedures are scheduled. To further prevent mutual inductance with the load in the adjacent inactive coil, the one or more capacitors C2 must also be disconnected. As described, "cable" comprises any removable flexible or rigid structure capable of electrically connecting one or more induction coils, such that the jumper cable 26 can comprise any suitably sized copper wire, plate, or the like as governed by the power, current, and voltage of the particular AC power source. Alternatively, as elsewhere explained herein, the jumper cable 26 can be replaced with, or further comprise therein, a switch or other selective electrical connection to reduce manual operation requirements of the present system. In such embodiments, the switch may be actuated to disconnect the top coil L1 from the bottom coil L2.

The AC power source 24 can comprise a variety of power supply topologies, such as, but not limited to, voltage-fed converters in full or half-bridge configurations with series resonant tank capacitors, current-fed converters having series or parallel resonant tank capacitors, and converters utilizing pulse width modulation (PWM) 30 as shown in FIGS. 2(*e*) and 3(*e*). Each of these power supply topologies comprises a rectifier and filter section 27, and a tuning capacitor section 29. In embodiments featuring PWM power supplies 30, the output frequency can be changed, such that changes in power output retain desirable efficiency and stirring characteristics as further described elsewhere herein. A control system 32 is operably connected to the PWM power supply 30 and implements software configured to adjust output frequency across multiple power levels to maintain desired efficiency and stirring characteristics without modifying the capacitance across the passive coil (the L-C tank circuit). Voltage sensing means V1 and V2 are provided to sense the instantaneous voltages across the bottom coil L2 and the top coil L1, respectively, wherein the sensed voltages are transmitted to the control system 32. Similarly, current sensing means I1 and I2 are provided to sense the instantaneous current through the bottom coil L2 and the top coil L1, respectively, wherein the sensed currents are transmitted to the control system 32. As such, a software controlled PWM power supply 30 facilitates adjustments of power distribution and phase shift between the top coil L1 and the bottom coil L2, and as a result, stirring patterns and velocities by changing the output frequency independent of output power without any other changes in the circuit.

Figure 4A:
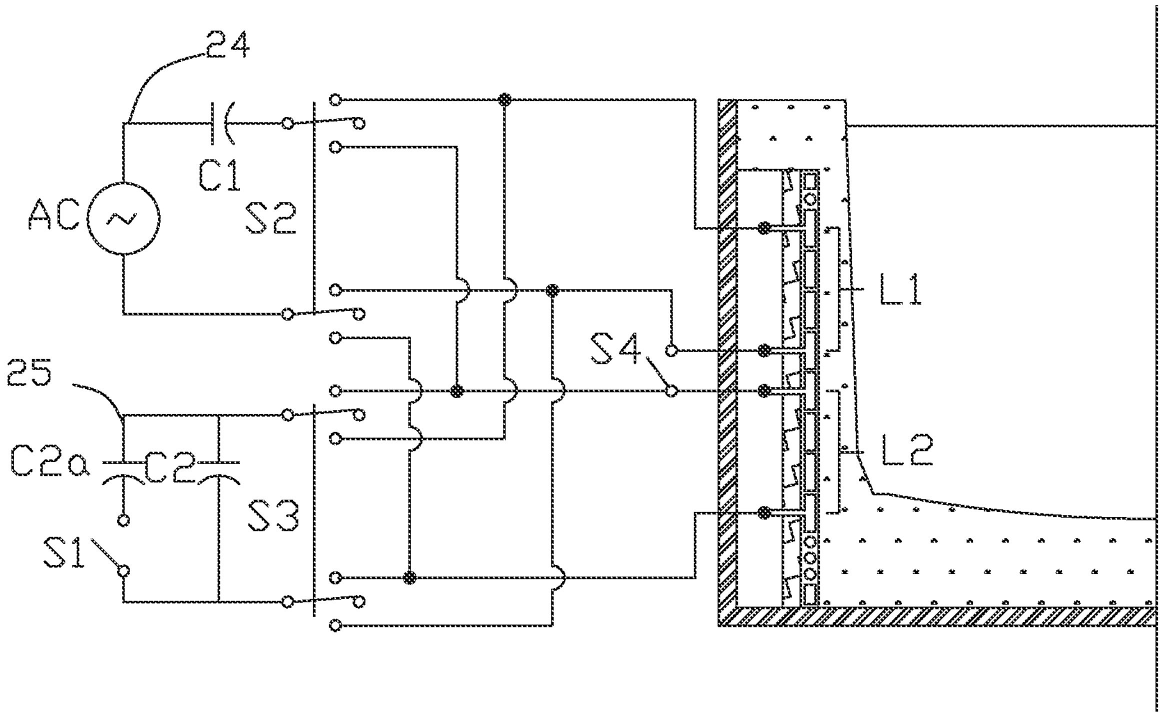
FIG. 4(*a*) illustrates a diagrammatic plan view of an example of the induction furnace with electrically separable coil system of FIG. 2(*c*) having selector switches for alternately connecting each of the top and bottom coil to the active and passive circuits, respectively.
Figure 4B:
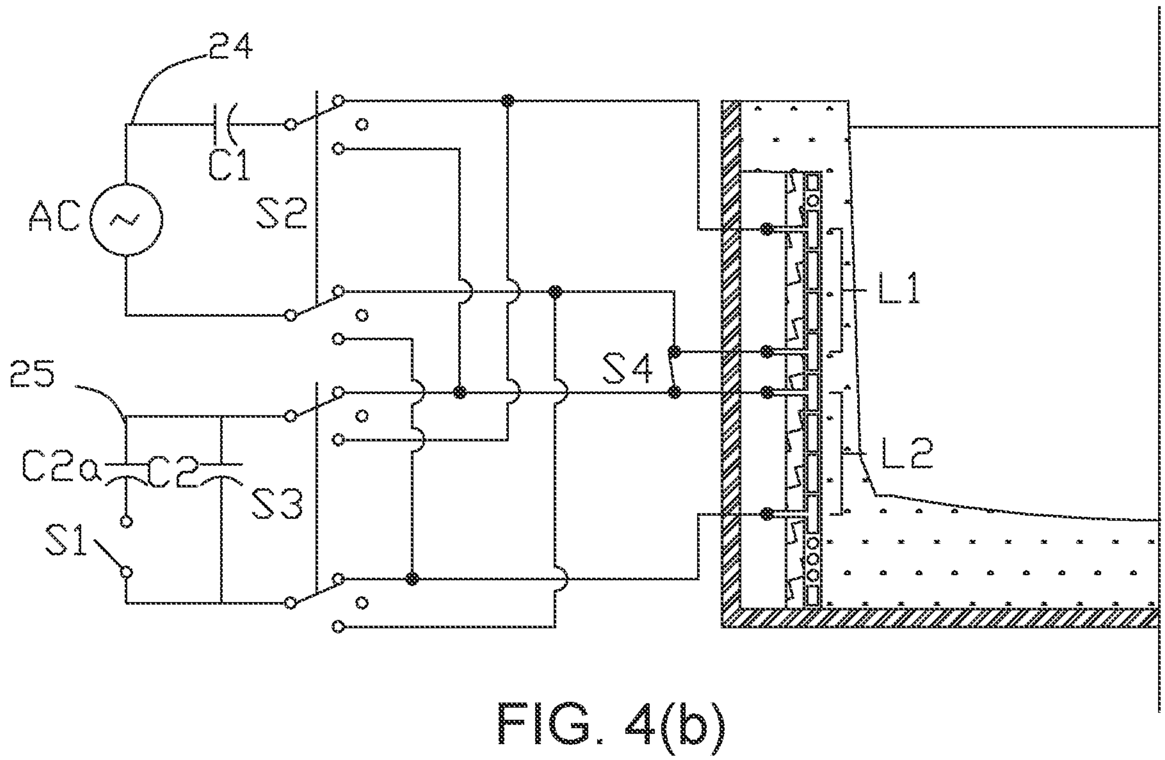
Figure 4C:
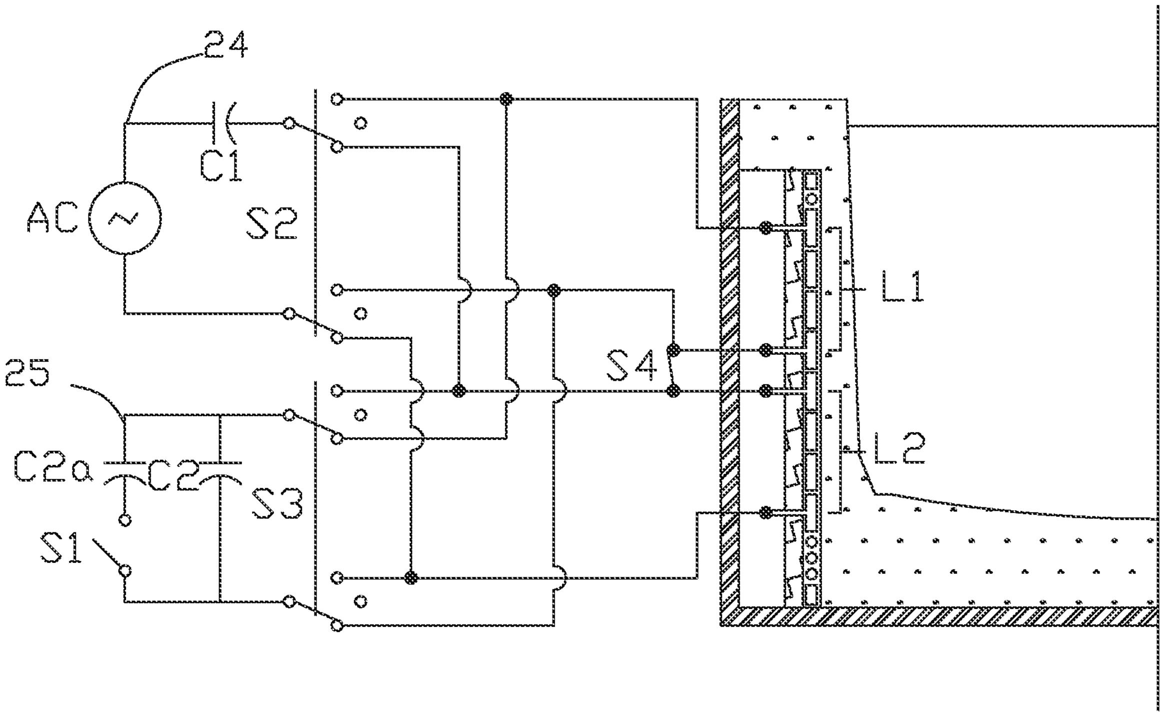

The connections to the top and bottom coil terminals for the AC power supply 24 and the capacitor bank 25 are identical and interchangeable, such that the top and bottom coils L1, L2 may be readily interchanged between the active and passive states. In some embodiments, suitably rated selector switches, as shown in FIGS. 4(*a*) through 4(*c*), may operably connect each of the capacitor bank 25 and the AC power supply 24 to one of the top coil L1 and the bottom coil L2, such that the AC power supply 24 and the capacitor bank 25 may be exchanged between the top coil L1 and the bottom coil L2 without manual disconnection from and reconnection to the coil terminals. In the shown embodiments, AC power supply 24 is selectively connected to each of the top coil L1 and the bottom coil L2 via switches S2 (power supply switches), whereupon placement of the switches S2 in a first position, switches S2 connect the AC power supply 24 to the top coil L1 as shown in FIG. 4(*b*), and whereupon placement of the switches S2 in a second position, switches S2 connect the AC power supply 24 to the bottom coil L2 as shown in FIG. 4(*c*). Similarly, capacitor bank 25 is selectively connected to each of the top coil L1 and the bottom coil L2 via switches S3 (tank circuit switches), whereupon placement of the switches S3 in a first position, switches S3 connect the capacitor bank 25 to bottom coil L2 as shown in FIG. 4(*b*), and whereupon placement of the switches S3 in a second position, switches S3 connect the capacitor bank 25 to the top coil L1, as shown in FIG. 4(*c*). Each of switches S2 and S3 are also selectively placed in a neutral third position disconnecting the AC power supply 24 and the capacitor bank 25 from both top coil L1 and bottom coil L2, as shown in FIG. 4(*a*). In such embodiments, when water-cooled conductors are used to connect to either coil, the use of selector switches negates the need for separate water-cooling circuits at the connection for each of the coils as otherwise required to facilitate exchanging AC power supply 24 and capacitor bank 25 connections as further described elsewhere herein. Alternatively, the same effect can be achieved via bolted connections inside a junction box without incorporating selector switches. Additionally, in the shown embodiments, switch S4 (isolation switch) replaces the external removable jumper cable, selectively electrically connecting the top coil L1 and the bottom coil L2.

Figure 5A:
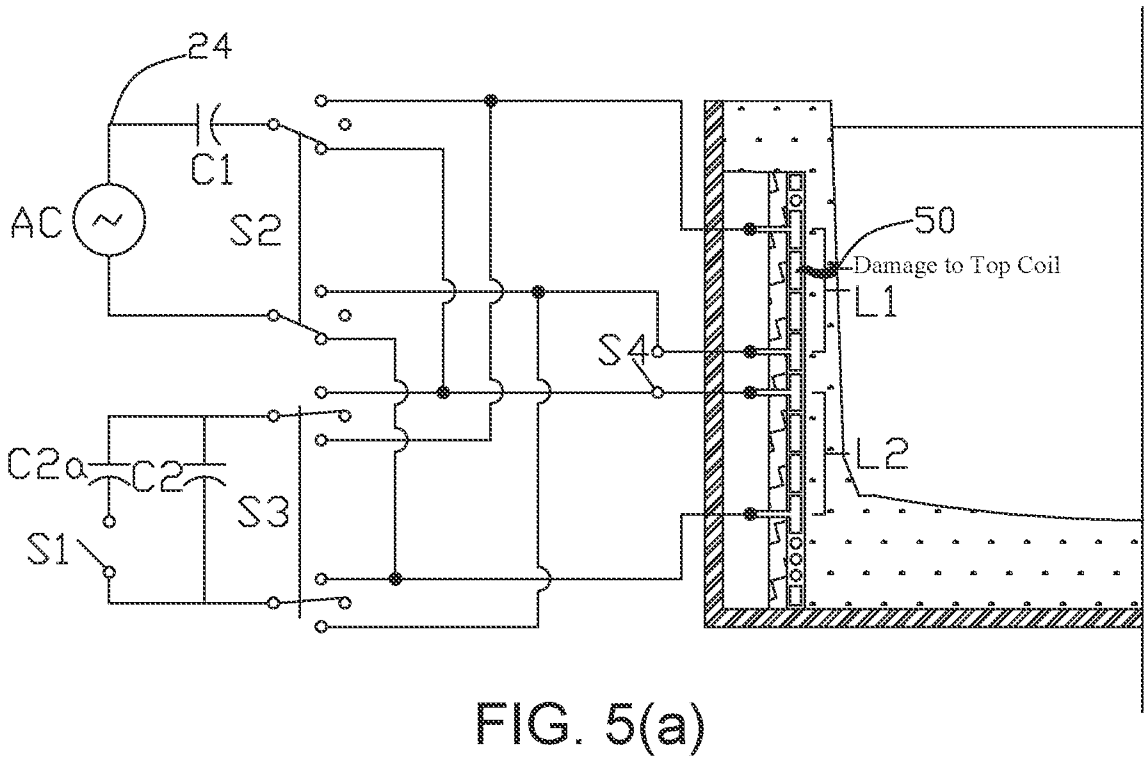
FIG. 5(*a*) illustrates a cross-sectional view of an example of the induction furnace with electrically separable coil system of FIG. 4(*a*) with the selector switches connecting the bottom coil to the active circuit and the top and bottom coils electrically separated for operation with the bottom coil only.
Figure 5B:
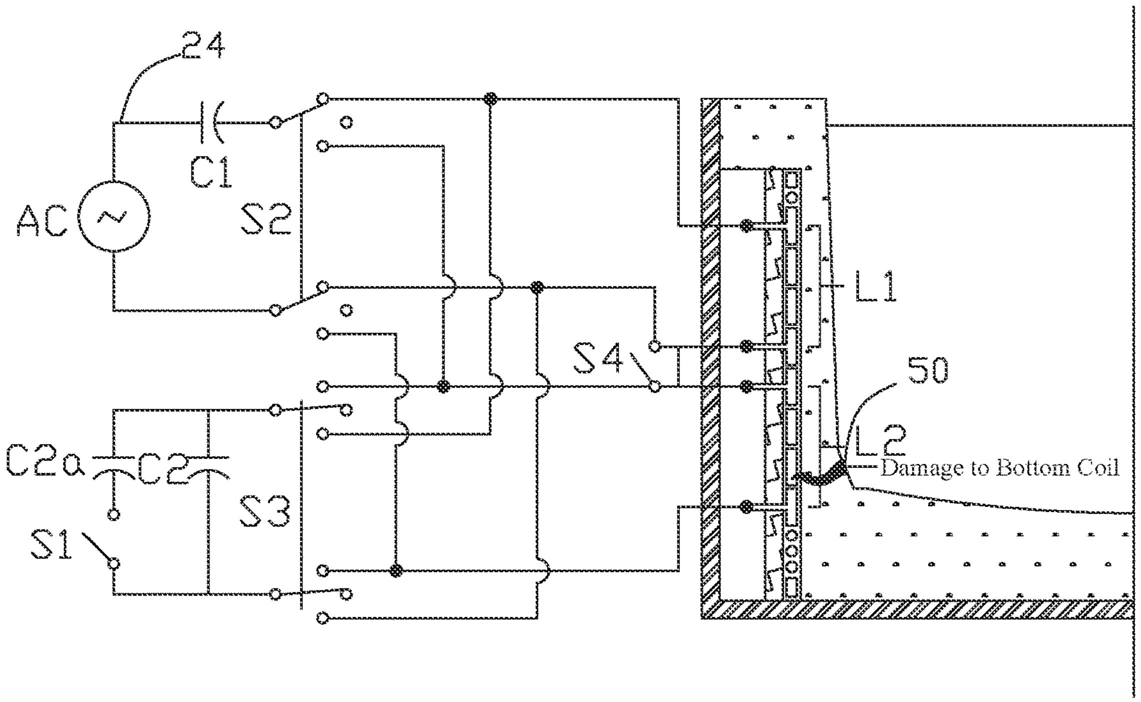

In the event of a ground fault to one of the top coil L1 or top coil section or the bottom coil L2 or bottom coil section, the GLD system associated with the AC power supply 24 and operably connected to each of the active and passive coils via the removable jumper cable 26 typically interrupts power supplied to the coils and alerts the operator of a potential metal infiltrate into the refractory lining or other short from the load to the coil system. The jumper cable 26 can then be removed or switched open to isolate the top coil L1 from the bottom coil L2 to identify the location of the fault. Upon locating the fault to one of the two coils or one coil section of a single coil system, the AC power supply 24 can be connected to the remaining coil or coil section to continue operation of the furnace system utilizing a single coil or coil section. In this manner, furnace operation can continue at reduced efficiency until repairs can be arranged and performed, increasing overall uptime of the system. Additionally, as the AC power supply 24 is directly connected to the remaining operable coil or coil section, GLD protection is retained on the remaining coil or coil section. For example, as shown in FIG. 5(*a*), the AC power supply 24 is connected to the bottom coil L2 or bottom coil section to continue operation of the bottom coil L2 while a ground fault is detected in the top coil L1 or top coil section. Similarly, as shown in FIG. 5(*b*), the AC power supply 24 is connected to the top coil L1 or top coil section to continue operation of the top coil L1 while a ground fault is detected in the bottom coil L2 or bottom coil section.

Figure 6A:
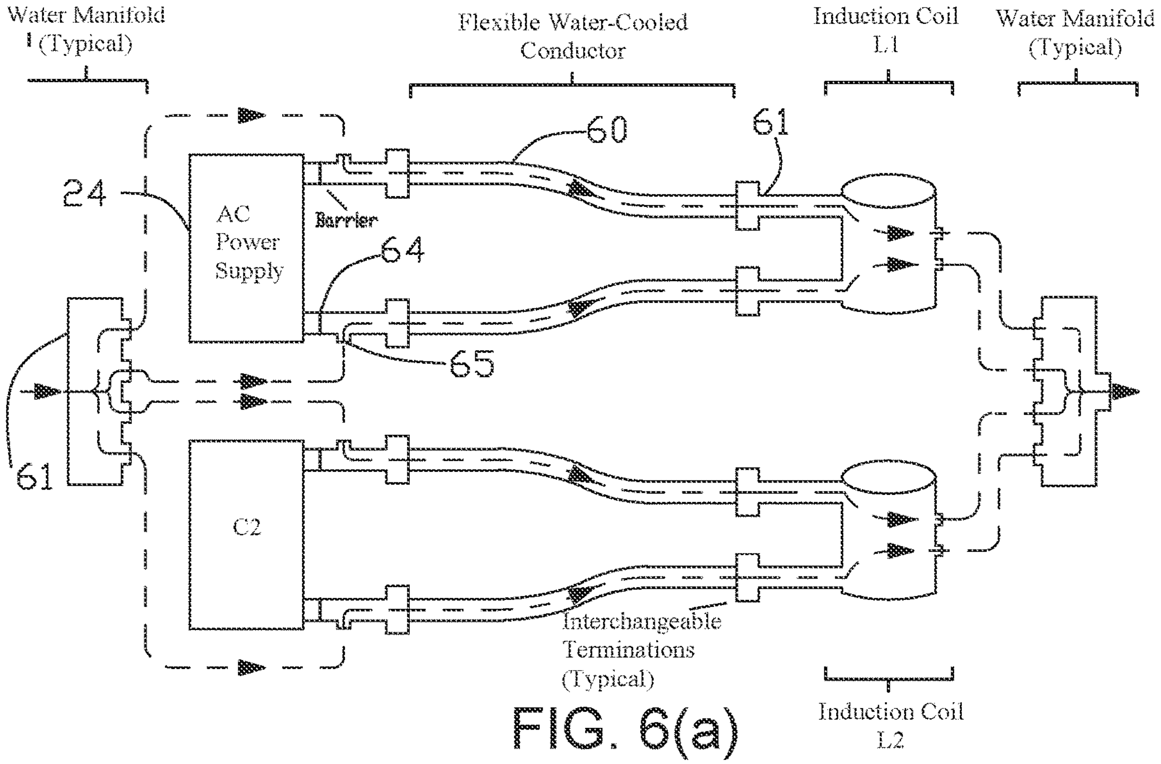
FIG. 6(*a*) illustrates a diagrammatic plan view of a typical water-cooling system of an induction furnace with electrically separable coil system.
Figure 6B:
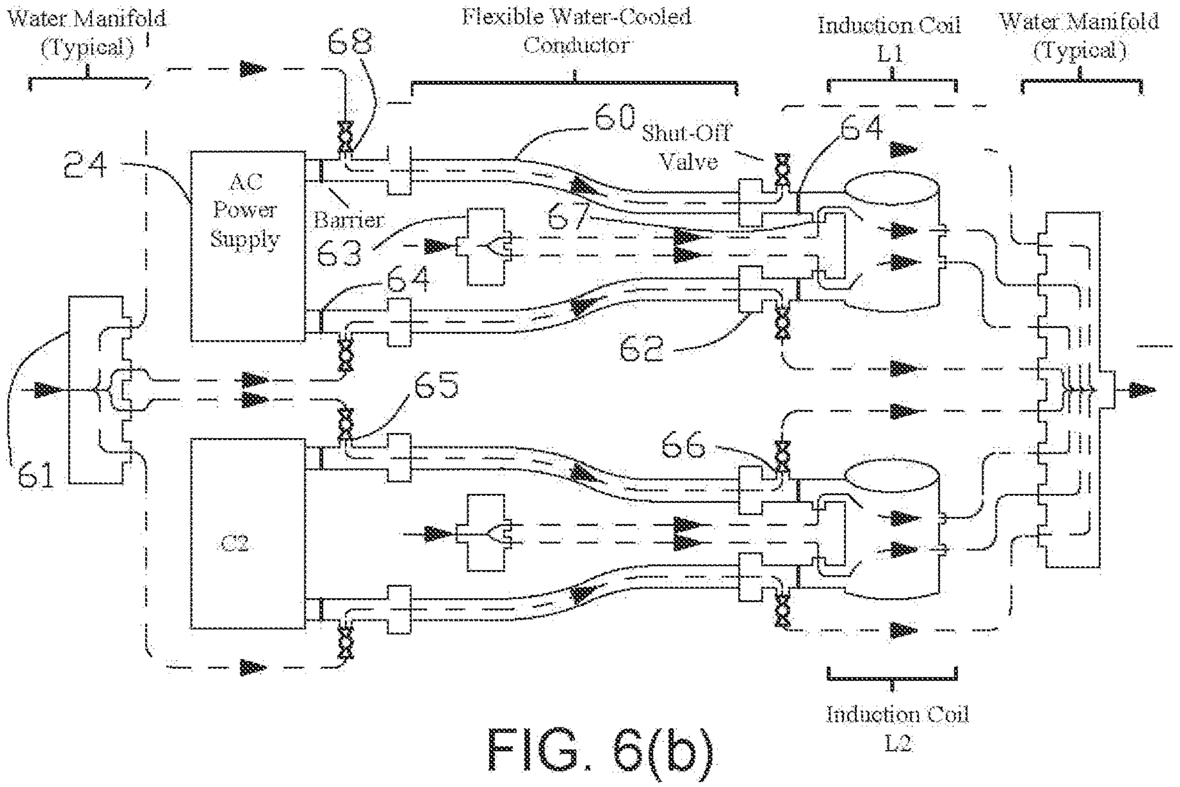
Figure 6C:
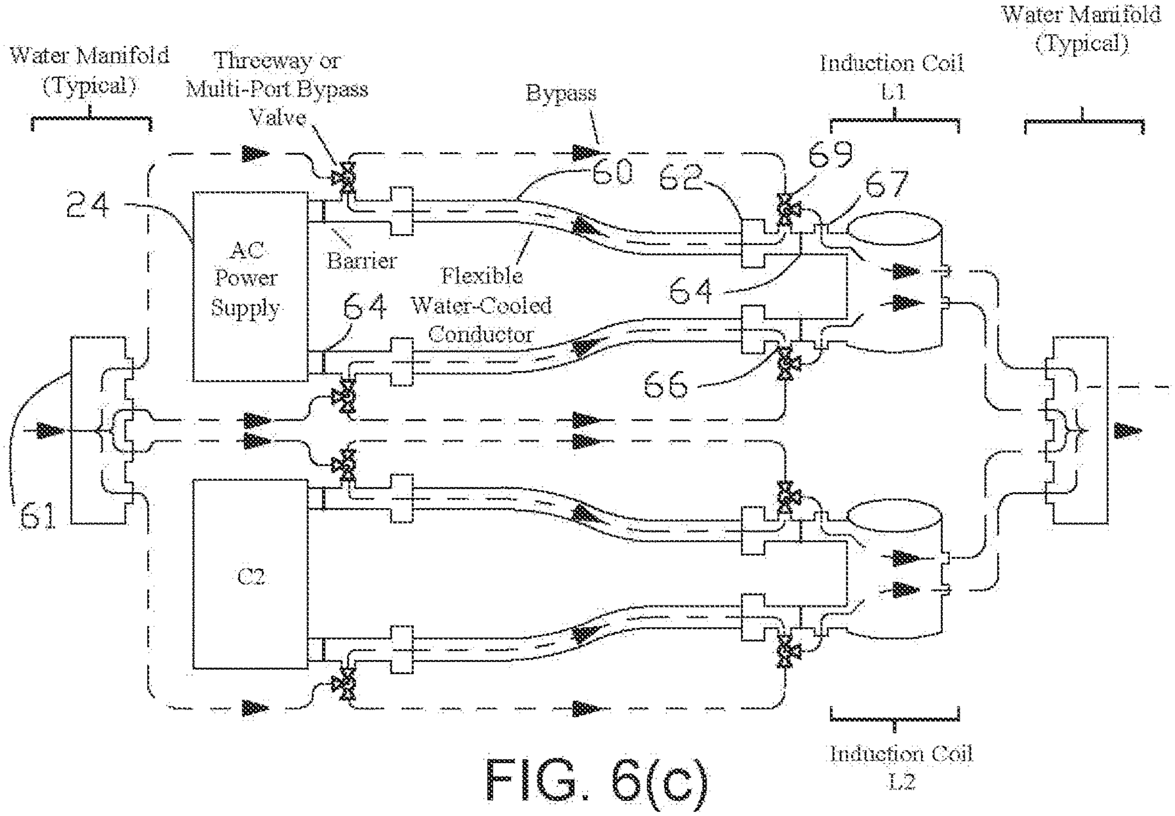

As shown in FIG. 6(*b*), the induction furnace system includes separate and independent cooling circuits defining a conductor cooling circuit and a coil cooling circuit. In this manner, when water-cooled conductors 60 are disconnected from the associated coil terminals 62 to exchange coil states between the active state and the passive state, the induction coil retains consistent flow of water cooling through the coil to mitigate damage to the coil and insulation due to exposure to elevated temperatures of the load or charge, thereby facilitating coil state changes during operation of the induction furnace. This is unlike the typical shared cooling arrangement shown in FIG. 6(*a*). In a typical induction furnace system, as shown in FIG. 6(*a*), water-cooled conductors 60 electrically connect the induction coil terminals 62 to the AC power supply 24 and the capacitor bank C2, wherein the water-cooled conductors 60 receive cooling water from a water source 61. The water-cooled conductors 60 further provide cooling water to an interior of the top and bottom induction coils L1 and L2 forming the shared conductor and coil water cooling circuit.

In contrast, the independent cooling circuits of the present invention comprise isolation valves 68 disposed between a primary water source 61 and the water-cooled conductors 60 as shown in FIG. 6(*b*), such that fluid flow to the water-cooled conductors 60 can be interrupted while flowing continuously through the top and bottom induction coils L1 and L2. In the illustrated embodiment of FIG. 6(*b*), the coil terminals 62 proximate to the AC power source 24 or the capacitor bank C2 comprise conductor inlet 65, and the coil terminals 62 proximate to the top and bottom coils, L1 and L2 comprise a conductor outlet 66, wherein water cooling is transmitted through the water-cooled conductor from conductor inlet 65 to conductor outlet 66. Additionally, one or more barriers 64 are present in each coil terminal 62 to prevent flow of water from the conductor cooling circuit into each of the AC power supply 24, the capacitor bank C2, and the top and bottom coils L1 and L2. A separate coil inlet 67 is disposed on the coil terminal 62 opposite the barrier 64, such that the water supplied to each coil is independent of the water flowing through water-cooled conductors 60. In one embodiment, the water-cooled conductors 60 and the induction coil cooling circuit are connected to independent water sources (primary water source 61 and supplemental water sources 63), such that each can be independently shut off as shown in FIG. 6(*b*). In another embodiment, the water-cooled conductors 60 and the induction coil share a common water source 61, wherein the isolation valves comprise multiport valves 69 capable of directing fluid flow to the water-cooled conductors 60 and the induction coil simultaneously in a first position, and only to the induction coil in a second position, as shown in FIG. 6(*c*). In alternate embodiments, where operationally appropriate, bolted connections within a junction box may be utilized to electrically connect each of the top and bottom coils L1 and L2 to the AC power supply 24 and the capacitor bank C2, respectively, in place of water-cooled conductors 60 to obviate the need for a separate water-cooling circuit.

Figure 7A:
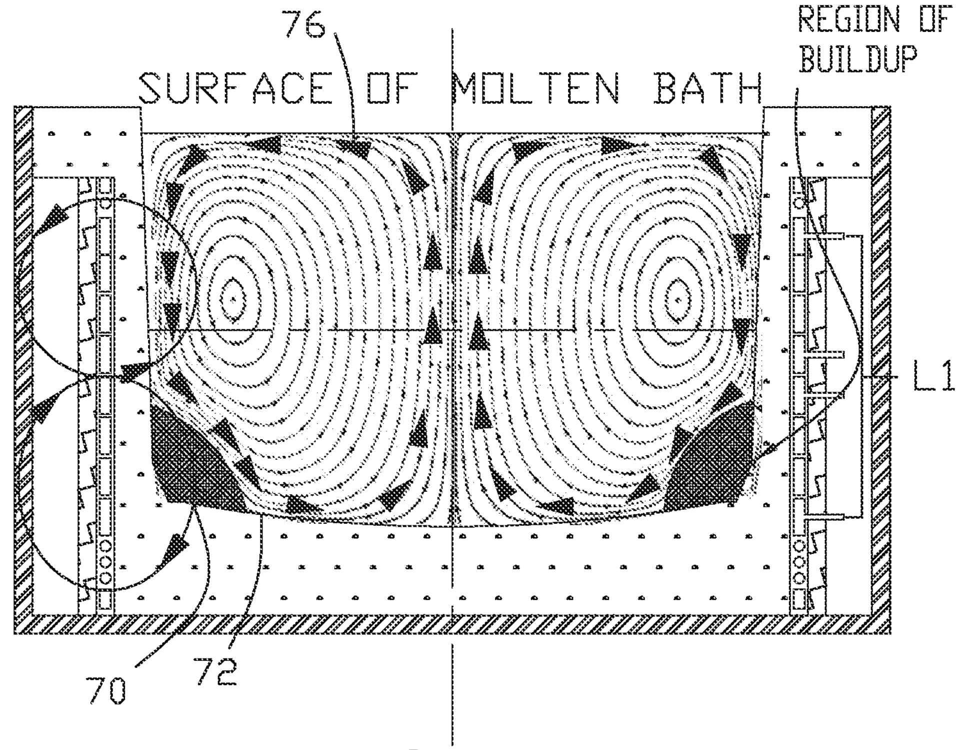
FIG. 7(*a*) illustrates a cross-sectional view of typical induced stirring patterns of a conventional induction furnace system of FIG. 1(*a*) showing the accumulation of dross in the bottom of the furnace interfering with operation.
Figure 7B:
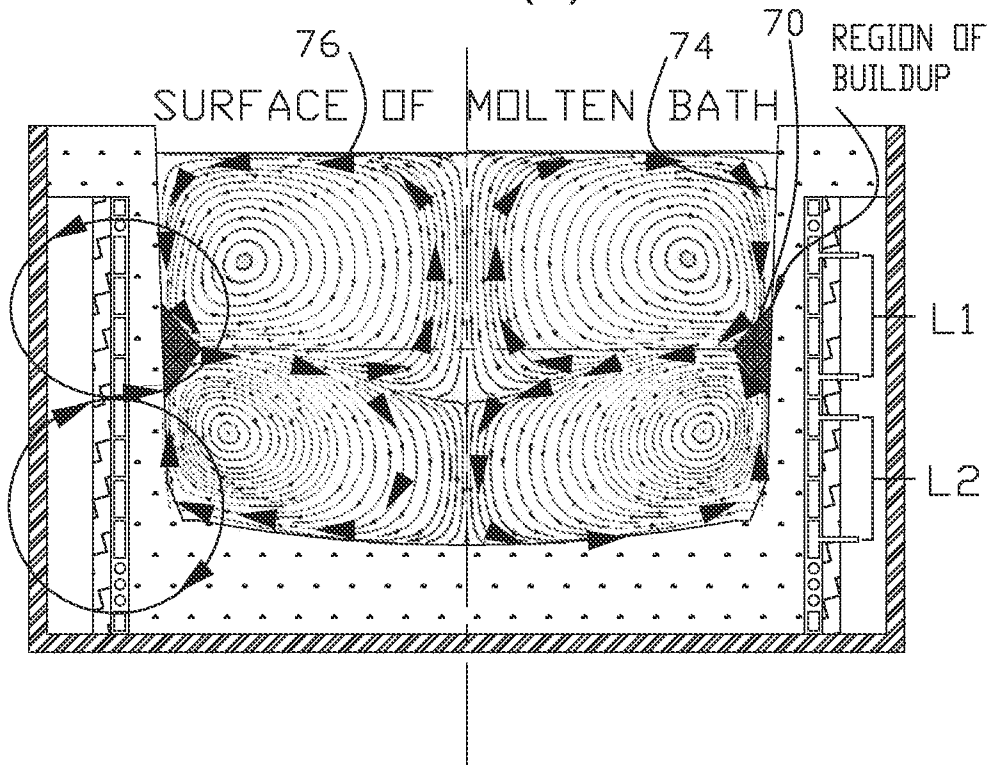
Figure 7C:
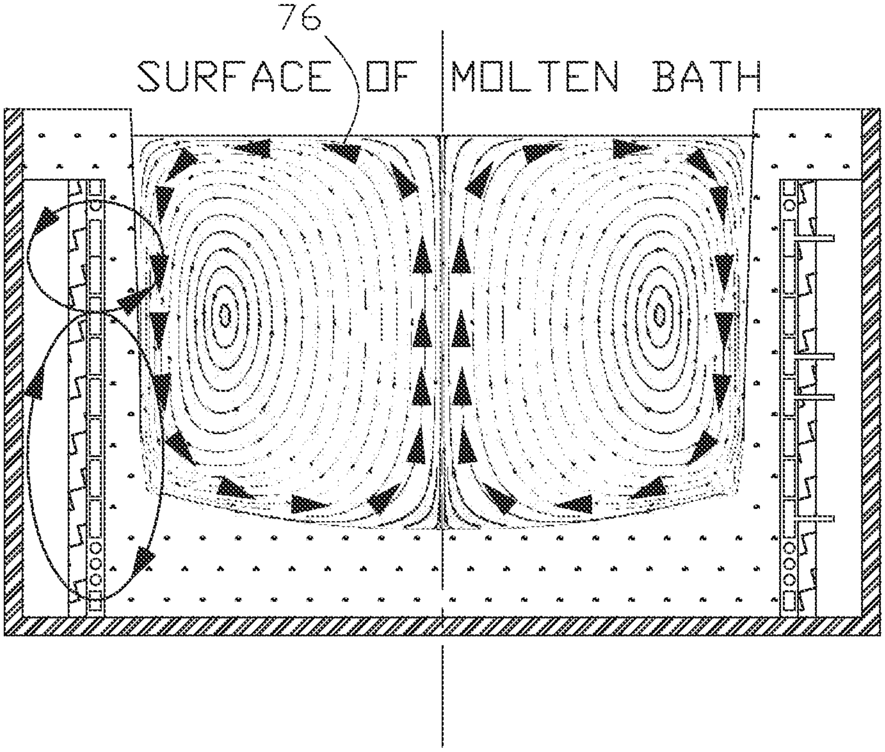
Figure 8A:
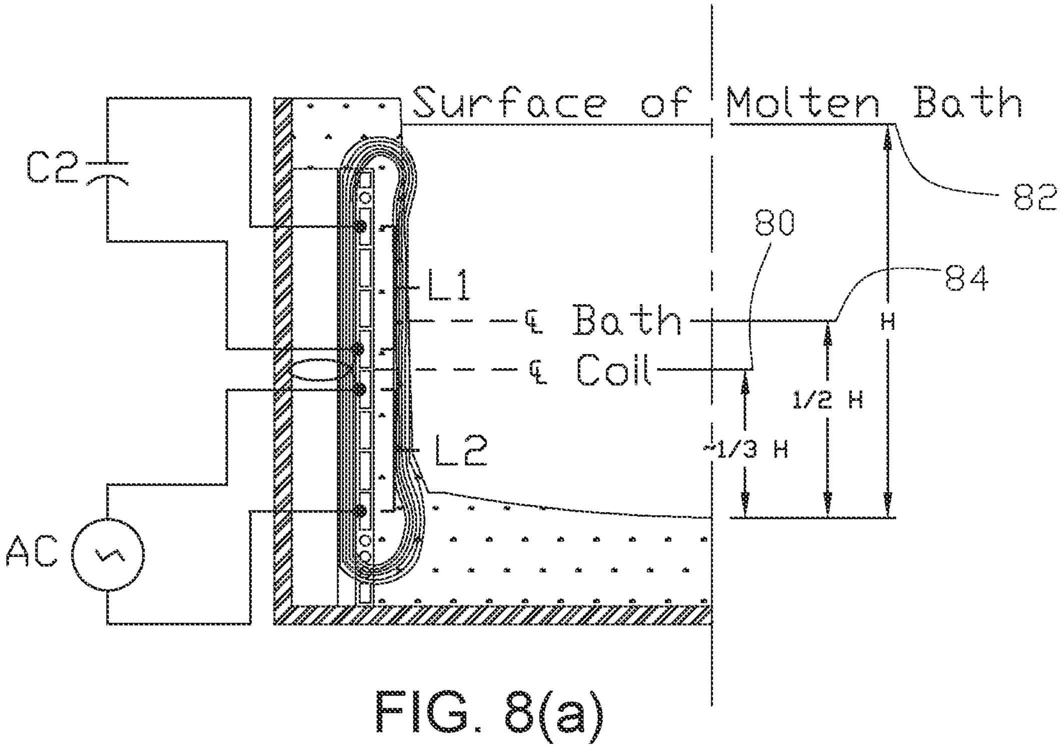
FIG. 8(*a*) illustrates a cross-sectional view of an induction furnace system showing fill lines corresponding to optimal active circuit connections for each of the top and bottom coils to prevent damage to the furnace system.
Figure 8B:
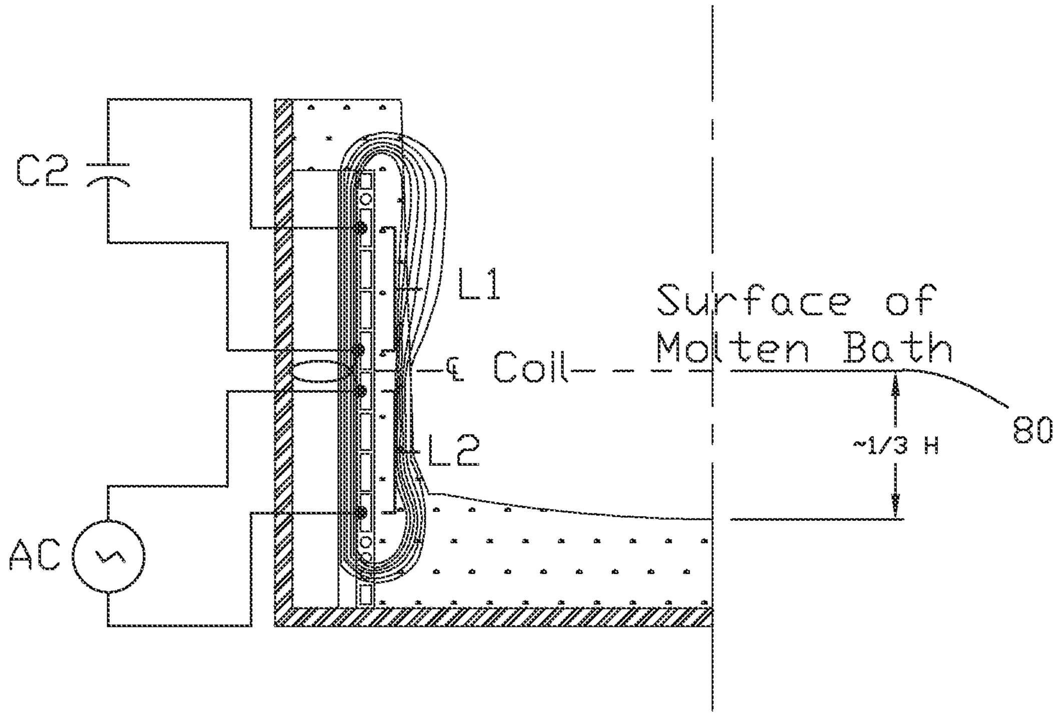
Figure 8C:
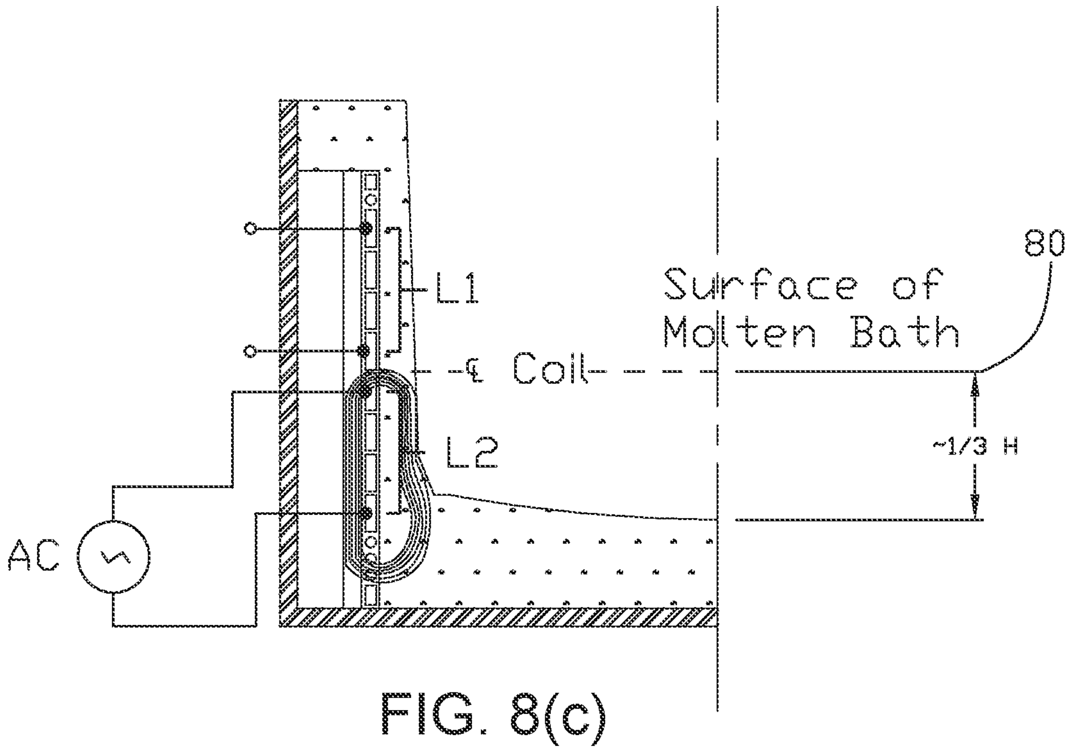
Figure 8D:
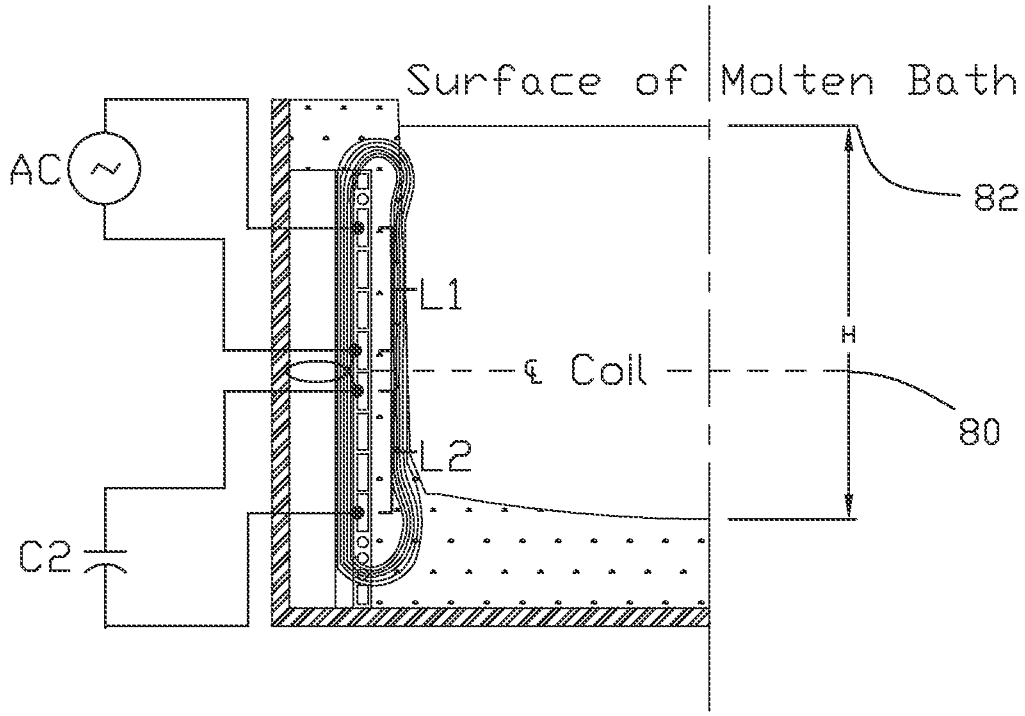
Figure 8E:
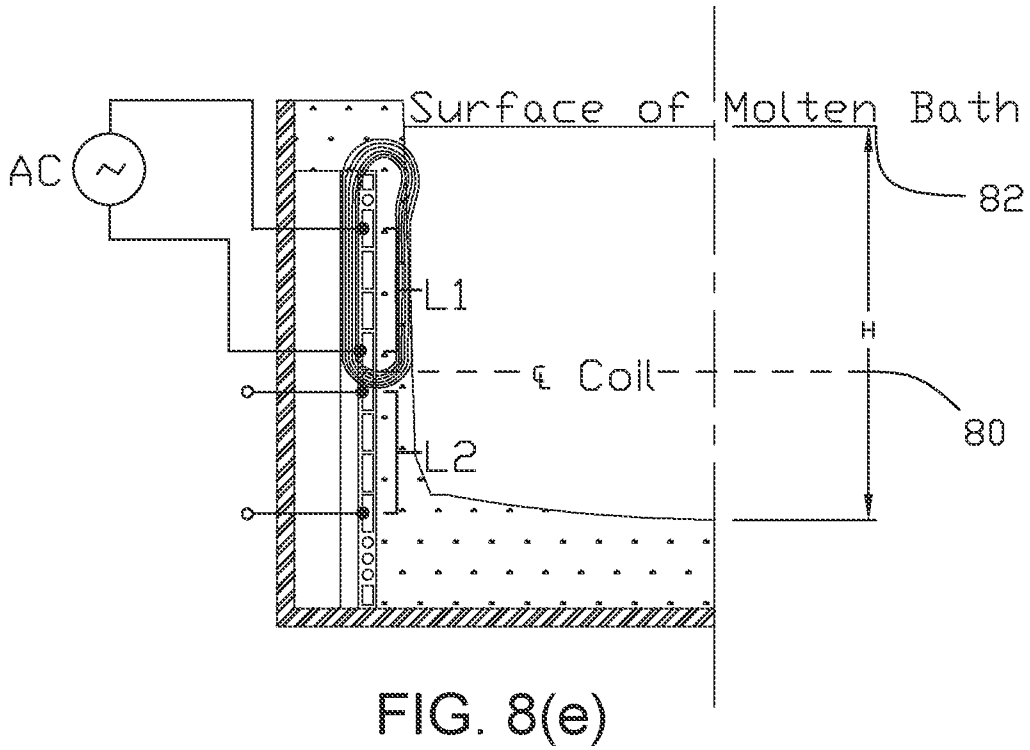

During operation of the furnace system, dross 70 is generated and can accumulate reducing the operating lifetime of the furnace system. For example, in the coating pot application shown in FIGS. 7(*a*) and 7(*b*), dross accumulation along the bottom surface 72 and side surface 74 of the furnace volume can impinge on the operation of the roller or other feed mechanism or feed material to be coated. Alternatively, over time dross 70 particle size increases and can measurably impact the quality of the coating being applied to the feed material. Once operation of the roller is impacted, furnace operation must be halted and the furnace drained to allow the dross 70 to be manually removed, which is a time-consuming and labor-intensive process. As such, altering the stirring characteristics throughout operation can reduce the rate of dross 70 generation or accumulation by selectively introducing increased stirring intensity in the associated portion of the furnace. For example, by maintaining a high relative stirring velocity, dross 70 particles can be maintained in suspension within the melt while further reducing dross 70 particle growth. Furthermore, consistently varying or pulsing the stirring patterns (melt flow patterns) 76 throughout operation as discussed elsewhere herein facilitates consistent movement of dross 70 particles, and more uniform mixing of the melt thereby reducing exposure to dead zones with little to no flow in which dross 70 particles can settle and accumulate as illustrated in FIG. 7(*c*). Dross 70 particle formation, growth, and accumulation is a function of, among other things, residence time in the bath and temperature of the bath, such that by maximizing stirring velocities, dross 70 formation and growth is interrupted while the particles are too small to cause measurable defects in the coating or feed material.

As the magnetic field generated by the induction coil interacts with the electrically conductive material, a stirring pattern 76 in the molten material is generated, aiding in heat distribution and homogeneity of the melt. The stirring pattern 76 can be affected by a variety of parameters, such as the power distribution between the active and passive coil arrangement. For example, any one or combination of varying the output frequency of the AC power supply, varying the power level, varying the total capacitance C2 connected across the passive coil, switching the active coil from the top coil L1 to the bottom coil L2 or vice versa, operating with a single active coil, or altering the furnace volume or the coil geometry all impact the produced stirring pattern.

Additionally, as disclosed in U.S. Pat. No. 7,457,344 (the '344 patent) and U.S. Pat. No. 9,370,049 (the '049 patent), each of which is herein incorporated by reference in their entirety, unidirectional stirring can be achieved by introducing a phase offset between the active and passive coil currents. The appropriate phase offset varies based upon coil geometry, load geometry, and symmetry of the system. Alternatively, as discussed above, utilization of a PWM power supply can provide a substantial benefit as the output frequency is independent of output power and can be changed to affect stirring intensity and pattern throughout the operational range of the furnace system. For example, software associated with the PWM power supply control system 32 can adjust power distribution, phase shift, and as a result stirring patterns 76 and velocities by changing the output frequency independent of output power without changing the circuit capacitance, such as the capacitance across the passive coil. By continually varying the stirring pattern 76, a more uniform bath temperature, chemistry, and dross 70 distribution can be achieved by avoiding dead zones of little to no flow.

Alternatively, when utilizing any resonant power supply, the passive coil parallel capacitance can be changed to vary power distribution between the active coil and the passive coil to adjust the stirring pattern 76 and velocity. Similarly, the passive coil parallel capacitance can be changed to adjust operating frequency thereby imparting a phase shift between the top and bottom coil currents to vary the stirring pattern 76 and velocity. The passive coil parallel capacitance can be adjusted by actuating intermediary switches within the capacitor bank as previously discussed. For example, holding total power output from the AC power supply constant, varying the number of parallel capacitors in circuit with the passive coil has a variety of impacts on stirring pattern 76 and velocity. As parallel capacitance increases, passive coil power increases while operating frequency decreases. Additionally, current phase shift between the two coils increases with parallel capacitance, producing stirring patterns having effectively two or four distinct zones. Desirable melt conditions are achieved when the average velocity of the melt is maximized and dead zones are at the minimum. The stirring pattern 76 and power distribution can also be changed via a switch. Finally, to electrically isolate the active coil from the passive coil, the jumper cable can be removed, or a switch actuated in embodiments utilizing selector switches as previously discussed. Additionally, the parallel capacitance must be disconnected in the passive coil circuit, such as by removing cables, removing bus links, or actuating switches within the capacitor bank, to prevent mutual inductance between the two coils. In this manner, the stirring pattern 76 is entirely derived from the active coil, which can further be adjusted as described before.

Furthermore, active and passive coil configurations may become more or less desirable throughout the standard life cycle and operation of the induction furnace system. For example, as the amount of molten material within the furnace volume increases, it becomes more efficient to operate the top and bottom coils in different configurations of the active state, the passive state, or disconnected and electrically separated from each other. In the illustrated embodiment of FIG. 8(*a*), the top L1 and bottom L2 coils are connected to a parallel capacitor and the AC power supply, respectively. The furnace volume in FIG. 8(*a*) is delineated into various fill levels relative to total furnace height H, and therefore maximum fill level 82. In the shown embodiment, a minimum fill level 80 for operation of the coil system is indicated at approximately one-third H, which is equivalent to the centerline of the induction coil system (midpoint between top coil L1 and bottom coil L2). In some such embodiments, the minimum fill level 80 can comprise a range between 25% and 40% of the furnace volume, with significant advantages in power delivery to the load identified at approximately 35% of the furnace volume over similar operating conditions in a furnace volume at capacity. Additionally, operating the furnace with the top coil L1 in the active circuit when the electrically conductive charge or load material is below a threshold fill level 84, as shown comprising approximately one-half H (midpoint of the furnace volume), can be detrimental to the lifetime of some furnace components including shunts and coil supports. Absent a substantial load to couple to, such as when the upper portion of the furnace volume is empty (as illustrated in FIG. 8(*b*)), the upper ends of the coil supports and shunts can become overheated.

For example, as illustrated in FIG. 8(*c*), during initial stages of furnace operation, such as when initially charging the furnace with metal or other electrically conductive material to be heated, energy can be more efficiently transferred to the electrically conductive charge or load material when the bottom coil L2 is connected in the active circuit and the top coil L1 is disconnected from the parallel capacitors C2 and electrically isolated from the top coil L1. As the level of molten material in the furnace volume rises beyond the minimum fill level 80, the top coil L1 can be electrically connected, however, the power provided to the top coil L1 when operating at less than the maximum fill level must be moderated to reduce the risk of damage to equipment. For example, the top coil L1 must operate at reduced power when the electrically conductive material is between the minimum fill level 80 and a maximum fill level 82 as a function of percent of furnace volume filled to prevent overheating upper furnace parts. As such, initially operating the furnace system with the bottom coil L2 in the active circuit and the top coil L1 disconnected is desirable to increase efficiency and decrease strain on equipment. Once the charge or load volume has reached the maximum fill level 82, the top coil L1 may be switched to the active circuit and the bottom coil L2 to the passive circuit as shown in FIG. 8(*d*), or further disconnected entirely as illustrated in FIG. 8(*e*), and vice versa as needed to facilitate desired stirring characteristics as previously described. In embodiments utilizing more than two induction coils or coil sections, as the furnace volume is filled, induction coils proximate to the current fill level may be switched to the active circuit progressively. For example, once the current fill level surpasses the height of a subsequent induction coil, the previous induction coil is switched to the passive circuit, and the subsequent induction coil is switched to the active circuit.

Other active and passive coil arrangements are within the scope of the disclosed invention, including arrangement including more than two independent induction coils. For example, multiple active and/or passive coil circuits may be utilized in various configurations having one or more overlapped coils and/or one or more non-overlapped coils.

While one type of power supply is shown in the figures for use with the electrically separable coil system of the invention, other power supply topologies can be used to the advantage of the coil system of the induction furnace system of the present invention.

The examples of the invention include references to specific electrical components. One skilled in the art may practice the invention by substituting components that are not necessarily of the same type but will create the desired conditions or accomplish the desired results of the invention. For example, single components may be substituted for multiple components or vice versa.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives, and modifications, aside from those expressly stated, are possible and within the scope of the invention. Those skilled in the art, having the benefit of the teachings of this specification, may make modifications thereto without departing from the scope of the invention.

The invention claimed is:

1. An induction furnace system with an electrically separable coil system, comprising:

a furnace volume;

an induction coil system for inductively heating and melting an electrically conductive material placed within the furnace volume, the induction coil system comprising:

at least one active induction circuit comprising:

an active induction coil having two or more active coil terminals, the active induction coil surrounding a partial section of the furnace volume;

a power supply having an input adapted to be connected to a source of power external to the induction furnace system and a primary ground leak detection system adapted to detect a ground fault in the at least one active induction circuit;

wherein an AC output of the power supply is operably connected to the two or more active coil terminals via one or more water-cooled conductors per active coil terminal;

at least one passive induction circuit comprising:

a passive induction coil having two or more passive coil terminals, the passive induction coil surrounding a subsequent partial section of the furnace volume;

one or more parallel capacitors operably connected to the two or more passive coil terminals defining an L-C tank circuit;

wherein the at least one active induction circuit is positioned relative to the at least one passive induction circuit such that the active induction coil magnetically couples to the passive induction coil when an AC current flows through the active induction coil;

a separable electrical connection electrically coupling the at least one active induction circuit to the at least one passive induction circuit when connected therebetween, and electrically isolating the at least one active induction circuit from the at least one passive induction circuit when disconnected therefrom; and wherein a terminal connector of each of the one or more water-cooled conductors are identical and interchangeable, such that the power supply and the one or more parallel capacitors can be exchanged between the active induction coil and the passive induction coil, defining a new active induction circuit and a new passive induction circuit, respectively.

2. The induction furnace system of claim 1, wherein the separable electrical connection comprises an externally disposed jumper cable removably affixed between the active induction coil and the passive induction coil.

3. The induction furnace system of claim 2, wherein the externally disposed jumper cable selectively disconnects from one of the active induction coil and the passive induction coil.

4. The induction furnace system of claim 1, wherein the separable electrical connection further comprises at least one passive filter.

5. The induction furnace system of claim 1, further comprising a supplemental ground leak detection system operably connected to the at least one passive induction circuit.

6. The induction furnace system of claim 5, further comprising an intermediary filter capacitor disposed between the at least one active induction circuit and the at least one passive induction circuit, the intermediary filter capacitor adapted to prevent DC current from the primary ground leak detection system from crossing to the at least one passive induction circuit.

7. The induction furnace system of claim 1, wherein the separable electrical connection comprises an isolation switch adapted to selectively connect the at least one active induction circuit and the at least one passive induction circuit when in a first position and selectively electrically isolate the at least one active induction circuit and the at least one passive induction circuit when in a second position.

8. The induction furnace system of claim 1, further comprising independent water-cooling circuits, comprising:

a primary water-cooling circuit having a primary water source transmitting cooling water through the one or more water-cooled conductors between a conductor inlet and a conductor outlet of each of the one or more water-cooled conductors;

an isolation valve disposed on each of the conductor inlets and each of the conductor outlets, the isolation valve adapted to halt cooling water flow through the primary water-cooling circuit when closed;

a secondary water-cooling circuit having a supplemental water source transmitting cooling water through the active induction coil and the passive induction coil between a coil inlet and a coil outlet, the coil inlet disposed on each active coil terminal and each passive coil terminal;

a barrier within each active coil terminal and each passive coil terminal between the conductor outlet and the coil inlet;

wherein the barrier prevents cooling water from the primary water-cooling circuit from passing into the interior of the active induction coil and the passive induction coil.

9. The induction furnace system of claim 1, further comprising a water-cooling circuit having a bypass circuit, the water-cooling circuit comprising:

a primary water source operably connected to each of a conductor inlet and a conductor outlet via one or more multiport valves, at least one of the one or more multiport valves operably connected to a coil inlet of each active coil terminal and each passive coil terminal;

wherein the one or more multiport valves are adapted to transmit cooling water from the primary water source through the one or more water-cooled conductors when in a first position and bypass the one or more water-cooled conductors when in a second position;

wherein cooling water from the primary water source is transmitted to each coil inlet when the one or more multiport valves is in each of the first position and the second position.

10. The induction furnace system of claim 1, wherein the one or more parallel capacitors are interconnected by intermediate switches defining a capacitor bank, such that the total capacitance of the one or more parallel capacitors is adjustable via actuation of the intermediate switches.

11. An induction furnace system with an electrically separable coil system, comprising:

a furnace volume;

an induction coil system for inductively heating and melting an electrically conductive material placed within the furnace volume, the induction coil system comprising:

at least one active induction circuit comprising:

an active induction coil having two or more active coil terminals, the active induction coil surrounding a partial section of the furnace volume;

a power supply having an input adapted to be connected to a source of power external to the induction furnace system and a primary ground leak detection system adapted to detect a ground fault in the at least one active induction circuit;

wherein an AC output of the power supply is operably connected to the two or more active coil terminals via one or more water-cooled conductors per active coil terminal;

at least one passive induction circuit comprising:

a passive induction coil having two or more passive coil terminals, the passive induction coil surrounding a subsequent partial section of the furnace volume;

one or more parallel capacitors operably connected to the two or more passive coil terminals defining an L-C tank circuit;

wherein the one or more parallel capacitors are interconnected by intermediate switches defining a capacitor bank, such that the total capacitance of the one or more parallel capacitors is adjustable via actuation of the intermediate switches;

wherein the at least one active induction circuit is positioned relative to the at least one passive induction circuit such that the active induction coil magnetically couples to the passive induction coil when an AC current flows through the active induction coil;

a separable electrical connection electrically coupling the at least one active induction circuit to the at least one passive induction circuit when connected therebetween, and electrically isolating the at least one active induction circuit from the at least one passive induction circuit when disconnected therefrom.

12. The induction furnace system of claim 11, wherein the separable electrical connection comprises an externally disposed jumper cable removably affixed between the active induction coil and the passive induction coil.

13. The induction furnace system of claim 11, wherein the separable electrical connection comprises an isolation switch adapted to selectively connect the at least one active induction circuit and the at least one passive induction circuit when in a first position and selectively electrically isolate the at least one active induction circuit and the at least one passive induction circuit when in a second position.

14. The induction furnace system of claim 11, wherein a terminal connector of each of the one or more water-cooled conductors are identical and interchangeable, such that the power supply and the one or more parallel capacitors can be exchanged between the active induction coil and the passive induction coil, defining a new active induction circuit and a new passive induction circuit, respectively.

15. An induction furnace system with an electrically separable coil system, comprising:

a furnace volume;

an induction coil system for inductively heating and melting an electrically conductive material placed within the furnace volume, the induction coil system comprising:

at least one active induction circuit comprising:

an active induction coil having two or more active coil terminals, the active induction coil surrounding a partial section of the furnace volume;

a power supply having an input adapted to be connected to a source of power external to the induction furnace system and a primary ground leak detection system adapted to detect a ground fault in the at least one active induction circuit;

wherein an AC output of the power supply is operably connected to the two or more active coil terminals via one or more water-cooled conductors per active coil terminal;

at least one passive induction circuit comprising:

a passive induction coil having two or more passive coil terminals, the passive induction coil surrounding a subsequent partial section of the furnace volume;

one or more parallel capacitors operably connected to the two or more passive coil terminals defining an L-C tank circuit;

wherein the at least one active induction circuit is positioned relative to the at least one passive induction circuit such that the active induction coil magnetically couples to the passive induction coil when an AC current flows through the active induction coil;

a separable electrical connection electrically coupling the at least one active induction circuit to the at least one passive induction circuit when connected therebetween, and electrically isolating the at least one active induction circuit from the at least one passive induction circuit when disconnected therefrom;

one or more independent water-cooling circuits, comprising:

a primary water-cooling circuit having a primary water source transmitting cooling water through the one or more water-cooled conductors between a conductor inlet and a conductor outlet of each of the one or more water-cooled conductors;

an isolation valve disposed on each of the conductor inlets and each of the conductor outlets, the isolation valve adapted to halt cooling water flow through the primary water-cooling circuit when closed;

a secondary water-cooling circuit having a supplemental water source transmitting cooling water through the active induction coil and the passive induction coil between a coil inlet and a coil outlet, the coil inlet disposed on each active coil terminal and each passive coil terminal;

a barrier within each active coil terminal and each passive coil terminal between the conductor outlet and the coil inlet;

wherein the barrier prevents cooling water from the primary water-cooling circuit from passing into the interior of the active induction coil and the passive induction coil.

16. The induction furnace system of claim 15, wherein the separable electrical connection comprises an isolation switch adapted to selectively connect the at least one active induction circuit and the at least one passive induction circuit when in a first position and selectively electrically isolate the at least one active induction circuit and the at least one passive induction circuit when in a second position.

17. The induction furnace system of claim 15, wherein a terminal connector of each of the one or more water-cooled conductors are identical and interchangeable, such that the power supply and the one or more parallel capacitors can be exchanged between the active induction coil and the passive induction coil, defining a new active induction circuit and a new passive induction circuit, respectively.

18. An induction furnace system with an electrically separable coil system, comprising:

a furnace volume;

an induction coil system for inductively heating and melting an electrically conductive material placed within the furnace volume, the induction coil system comprising:

at least one active induction circuit comprising:

an active induction coil having two or more active coil terminals, the active induction coil surrounding a partial section of the furnace volume;

a power supply having an input adapted to be connected to a source of power external to the induction furnace system and a primary ground leak detection system adapted to detect a ground fault in the at least one active induction circuit;

wherein an AC output of the power supply is operably connected to the two or more active coil terminals via one or more water-cooled conductors per active coil terminal;

at least one passive induction circuit comprising:

a passive induction coil having two or more passive coil terminals, the passive induction coil surrounding a subsequent partial section of the furnace volume;

one or more parallel capacitors operably connected to the two or more passive coil terminals defining an L-C tank circuit;

wherein the at least one active induction circuit is positioned relative to the at least one passive induction circuit such that the active induction coil magnetically couples to the passive induction coil when an AC current flows through the active induction coil;

a separable electrical connection electrically coupling the at least one active induction circuit to the at least one passive induction circuit when connected therebetween, and electrically isolating the at least one active induction circuit from the at least one passive induction circuit when disconnected therefrom;

a water-cooling circuit having a bypass circuit, comprising:

a primary water source operably connected to each of a conductor inlet and a conductor outlet via one or more multiport valves, at least one of the one or more multiport valves operably connected to a coil inlet of each active coil terminal and each passive coil terminal;

wherein the one or more multiport valves are adapted to transmit cooling water from the primary water source through the one or more water-cooled conductors when in a first position and bypass the one or more water-cooled conductors when in a second position;

wherein cooling water from the primary water source is transmitted to each coil inlet when the one or more multiport valves is in each of the first position and the second position.

19. The induction furnace system of claim 18, wherein the separable electrical connection comprises an isolation switch adapted to selectively connect the at least one active induction circuit and the at least one passive induction circuit when in a first position and selectively electrically isolate the at least one active induction circuit and the at least one passive induction circuit when in a second position.

20. The induction furnace system of claim 18, wherein a terminal connector of each of the one or more water-cooled conductors are identical and interchangeable, such that the power supply and the one or more parallel capacitors can be exchanged between the active induction coil and the passive induction coil, defining a new active induction circuit and a new passive induction circuit, respectively.

* * * * *